(12) United States Patent
Mironica et al.

(10) Patent No.: US 11,393,077 B2
(45) Date of Patent: Jul. 19, 2022

(54) CORRECTING DUST AND SCRATCH ARTIFACTS IN DIGITAL IMAGES

(71) Applicant: Adobe Inc., San José, CA (US)

(72) Inventors: Ionut Mironica, Bucharest (RO); Oscar Bolaños, Basel (CH); Andreea Birhală, Bucharest (RO)

(73) Assignee: Adobe Inc., San Jose, CA (US)

( * ) Notice: Subject to any disclaimer, the term of this patent is extended or adjusted under 35 U.S.C. 154(b) by 7 days.

(21) Appl. No.: 15/930,995

(22) Filed: May 13, 2020

(65) Prior Publication Data

US 2021/0358092 A1   Nov. 18, 2021

(51) Int. Cl.
| | |
|---|---|
| G06K 9/62 | (2022.01) |
| G06T 7/33 | (2017.01) |
| G06T 5/50 | (2006.01) |
| G06T 5/00 | (2006.01) |
| G06T 7/00 | (2017.01) |

(52) U.S. Cl.
CPC ............ *G06T 5/005* (2013.01); *G06K 9/6232* (2013.01); *G06T 5/50* (2013.01); *G06T 7/0002* (2013.01); *G06T 7/337* (2017.01); *G06T 2200/24* (2013.01); *G06T 2207/20081* (2013.01); *G06T 2207/20084* (2013.01); *G06T 2207/30168* (2013.01)

(58) Field of Classification Search
None
See application file for complete search history.

(56) References Cited

U.S. PATENT DOCUMENTS

| | | | |
|---|---|---|---|
| 6,327,056 B1 | 12/2001 | Tsai et al. | |
| 11,068,141 B1* | 7/2021 | Barton | ............... G06K 9/00228 |
| 2010/0321537 A1* | 12/2010 | Zamfir | .................... G06T 5/005 |
| | | | 348/241 |
| 2020/0151503 A1* | 5/2020 | Wang | ................... G06K 9/6256 |
| 2020/0242774 A1* | 7/2020 | Park | ....................... G06T 11/001 |
| 2021/0085238 A1* | 3/2021 | Schnabel | ............. A61B 5/4542 |

(Continued)

OTHER PUBLICATIONS

"Adobe Photoshop", Retrieved at: https://www.adobe.com/products/photoshop.html—Apr. 24, 2020, 12 pages.

(Continued)

*Primary Examiner* — James A Thompson
(74) *Attorney, Agent, or Firm* — FIG. 1 Patents

(57) ABSTRACT

In implementations of correcting dust and scratch artifacts in digital images, an artifact correction system receives a digital image that depicts a scene and includes a dust or scratch artifact. The artifact correction system generates, with a generator of a generative adversarial neural network (GAN), a feature map from the digital image that represents features of the dust or scratch artifact and features of the scene. A training system can train the generator adversarially to reduce visibility of dust and scratch artifacts in digital images against a discriminator, and train the discriminator to distinguish between reconstructed digital images generated by the generator and real-world digital images. The artifact correction system generates, from the feature map and with the generator, a reconstructed digital image that depicts the scene of the digital image and reduces visibility of the dust or scratch artifact of the digital image.

20 Claims, 9 Drawing Sheets

(56) References Cited

U.S. PATENT DOCUMENTS

2021/0097661 A1* 4/2021 Palo .................. G01N 33/4833
2021/0209388 A1* 7/2021 Ciftci ..................... G06V 40/40

OTHER PUBLICATIONS

Badrinarayanan,"SegNet: A Deep Convolutional Encoder-Decoder Architecture for Image Segmentation", Oct. 10, 2016, 14 pages.
Bergman,"Comprehensive Solutions for Removal of Dust and Scratches from Images", Feb. 6, 2007, 27 pages.
Besserer,"Detection and Tracking Scheme for Line Scratch Removal in an Image Sequence", May 2004, 12 pages.
Elgharib,"Blotch and scratch removal in archived film using a semi-transparent corruption model and a ground-truth generation technique", Dec. 2013, 21 pages.
Goodfellow,"Generative Adversarial Nets", In: Advances in neural information processing systems (2014), Jun. 10, 2014, 9 pages.
Gorriz,"End-to-End Conditional GAN-based Architectures for Image Colourisation", Sep. 5, 2019, 6 pages.
Hu,"Exposure: A White-Box Photo Post-Processing Framework", Feb. 6, 2018, 23 pages.
Ioffe,"Batch Normalization: Accelerating Deep Network Training by Reducing Internal Covariate Shift", Mar. 2015, 11 pages.
Isola,"Image-to-Image Translation with Conditional Adversarial Networks", 2017 IEEE Conference on Computer Vision and Pattern Recognition (CVPR), Nov. 22, 2017, 17 pages.
Kingma,"Adam: A Method for Stochastic Optimiziation", Dec. 22, 2014, 9 pages.
Lim,"Enhanced Deep Residual Networks for Single Image Super-Resolution", Jul. 10, 2017, 9 pages.
Lv,"MBLLEN: Low-light Image/Video Enhancement Using CNNs", Jan. 2018, 13 pages.
Nazeri,"Image Colorization using Generative Adversarial Networks", Jun. 2018, 11 pages.
Oliveira,"Fast Digital Image Inpainting", In: International Conf. on Visualization, Image and Image Proc. (2001), Sep. 2001, 6 pages.
Park,"Distort-and-Recover: Color Enhancement using Deep Reinforcement Learning", Apr. 16, 2018, 9 pages.
Radford,"Unsupervised Representation Learning with Deep Convolutional Generative Adversarial Networks", ICLR 2016, Jan. 7, 2016, 16 pages.
Simonyan,"Very deep convolutional networks for large-scale image recognition", In Journal of Computing Research Repository, Sep. 2014, 14 pages.
Trumpy,"Optical Detection of Dust and Scratches on Photographic Film", Mar. 2015, 19 pages.
Wang,"Image Quality Assessment: From Error Visibility to Structural Similarity", IEEE Transactions on Image Processing, vol. 13, No. 4, Apr. 2004, 14 pages.
Wei,"Single Image Reflection Removal Exploiting Misaligned Training Data and Network Enhancements", Apr. 1, 2019, 10 pages.
Zhou,"Removal of Image Artifacts Due to Sensor Dust", Jun. 2007, 8 pages.

* cited by examiner

700 ⟶

Receive a digital image that depicts a scene and
includes at least one dust or scratch artifact
702

↓

Generate, with a generator of a neural network, a feature map from the digital
image that represents features of the at least one dust or scratch artifact and
additional features of the scene, the generator being trained adversarially
against a discriminator of the neural network that is trained to distinguish
between artifact digital images generated by the generator that denote
locations of the dust and scratch artifacts in the digital images and other
artifact digital images not generated by the generator
704

↓

Generate, with the generator and from the feature map,
an artifact digital image that indicates pixels of the digital image affected by
the at least one dust or scratch artifact and additional pixels of the digital
image unaffected by the at least one dust or scratch artifact
706

FIG. 7

CORRECTING DUST AND SCRATCH ARTIFACTS IN DIGITAL IMAGES

BACKGROUND

This application claims priority under 35 USC 119 or 365 to Romanian Application No. A/10023/2020, filed May 13, 2020, the disclosure of which is incorporated in its entirety.

Digital cameras are replete around the globe, and produce digital images that can be easily shared between users via the myriad of electronic communication services available, including social media, email, cellular services, etc. However, in recent years there has been a resurgence in photography using film cameras that produce analog images on film negatives. Since users enjoy the convenience of sharing images in a digital format, the users of film cameras often digitize their film negatives. When digitizing the film negatives to produce digital images, dust and scratches on the film negatives can cause undesirable artifacts on the digital images, such as dark spots, light spots, blurry regions, streaks, and the like. Dust refers to small, foreign bodies on the surface of the film negative, and a scratch refers to missing material from the film negative.

Traditionally, film negatives are digitized with dedicated film scanners that typically rely on infrared technologies to detect artifacts caused by dust and scratches on the film negatives. However, detecting dust and scratch artifacts with these dedicated scanners is generally limited to color film negatives, since the silver halides used to form black-and-white film negatives prevent the infrared technologies from detecting the dust and scratches on the black-and-white film negatives. Moreover, these dedicated film scanners are often prohibitively expensive for most consumers to own, and instead can be accessed at commercial photography labs by consumers for fees, resulting in a cumbersome and costly workflow for a user to digitize a film image.

Consequently, many users of film cameras generate their own digital images from their film negatives by digitizing the film negatives with a digital camera. For instance, a user can capture a digital image from a film negative with a digital camera, such as a digital single lens reflex (DSLR) camera, a camera integrated into a cell phone, etc. To minimize the artifacts on the digital image from dust and scratches on the film negatives, the users often thoroughly clean the film negatives prior to being digitized. However, cleaning the film negative usually does not remove all dust, and the act of cleaning itself can introduce scratches and debris to the film negative that cause artifacts on the digital image captured from the film negative.

Hence, users often rely on artifact correction systems that process the digital image that has been captured from a film negative and attempt to redress dust and scratch artifacts. However, conventional artifact correction systems can degrade the quality of the digital image when correcting dust and scratch artifacts. For example, conventional artifact correction systems often apply digital spatial filters that can blur and reduce the sharpness of the digital image. In some cases, the entire digital image is affected by the digital spatial filters, rather than just the areas of the digital image having dust and scratch artifacts, rendering the digital image unusable due to the degradation in image quality (e.g., a lack of overall sharpness).

Accordingly, some conventional artifact correction systems facilitate manual identification and correction of dust and scratch artifacts individually in a digital image. However, these conventional artifact correction systems can require significant amounts of user interaction since each artifact is individually segmented and corrected, rendering the system inefficient. Hence, these conventional artifact correction systems are not suitable for applications involving many digital images, such as a video sequence made up of digital images formed by digitizing individual frames of a film strip, due to the amounts of user interaction involved in individually segmenting and correcting each dust and scratch artifact in each of the digital images.

Therefore, conventional artifact correction systems are not suitable for film negatives and digital images generated from the film negatives and are costly and inefficient to use. Moreover, the conventional artifact correction systems may not work properly for black-and-white images, and can degrade the quality of the digital image when correcting dust and scratch artifacts.

SUMMARY

Techniques and systems are described for correcting dust and scratch artifacts in digital images. A training system is implemented to generate synthetic digital images that depict synthetic artifacts, such as synthetic dust artifacts and synthetic scratch artifacts. The synthetic digital images can include black-and-white digital images having white pixels that denote the presence of synthetic dust and scratch artifacts and black pixels that denote the absence of the synthetic dust and scratch artifacts. The training system can generate training digital images by combining the content of the synthetic digital images with content of clean digital images (e.g., scanned film negatives) that depict scenes and are free of artifacts caused by dust and scratches. The training system uses the training images as input and the clean digital images as ground truth to train a generative-adversarial neural network that includes a generator and a discriminator. For instance, the training system adversarially trains the generator to correct (e.g., visually reduce the appearance of) the dust and scratch artifacts of the training digital images against the discriminator to distinguish between reconstructed digital images generated by the generator and real-world digital images. Once trained, the training system provides the generator to an artifact correction system for installation and implementation on a client device to detect and correct dust and scratch artifacts in user-provided digital images, such as digital images captured from film negatives, digital images captured from paper images, and the like.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 7 illustrates a flow diagram depicting an example procedure in accordance with one or more aspects of the disclosure.

DETAILED DESCRIPTION

Overview

Figure 1:
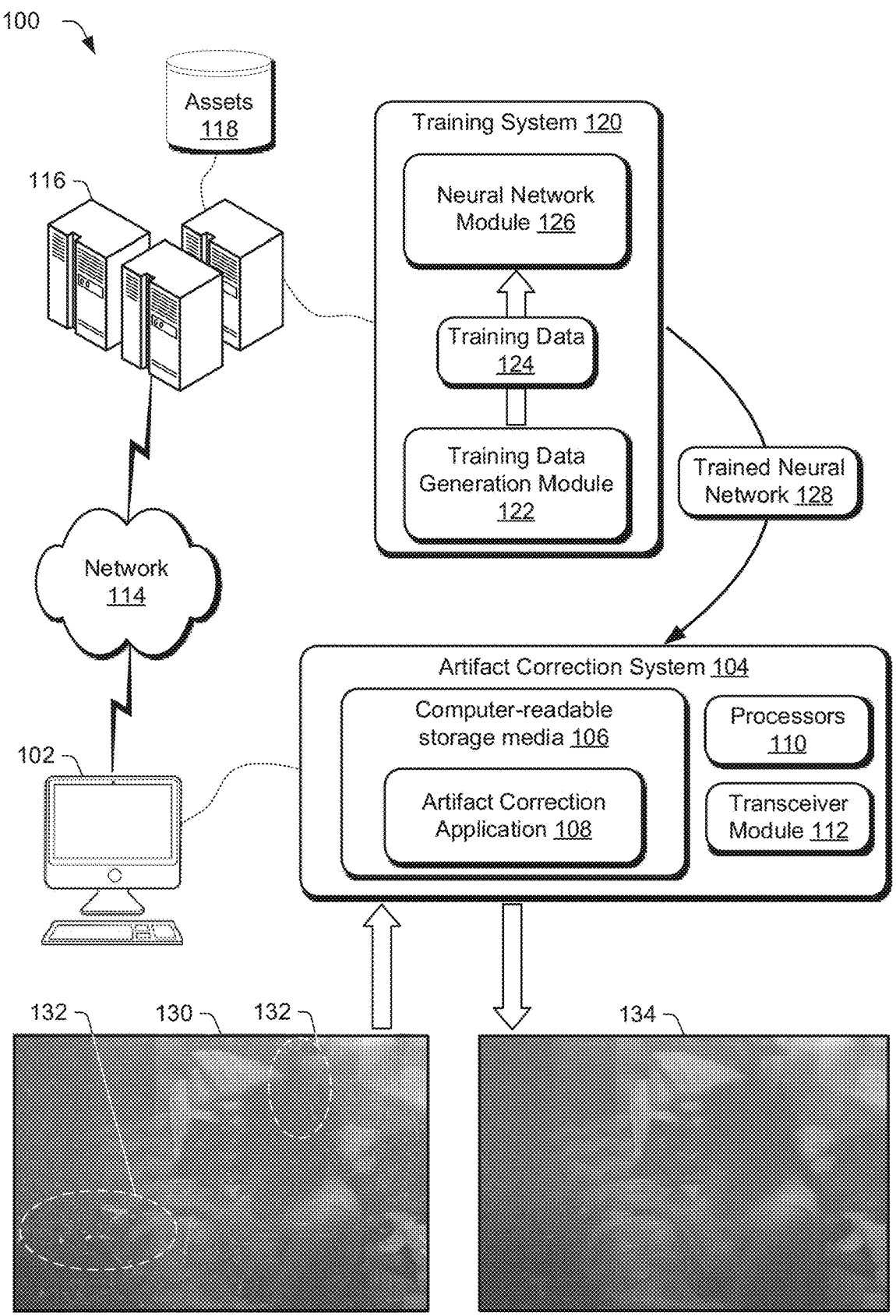
FIG. 1 illustrates a digital medium environment in an example implementation that is operable to employ techniques described herein.

Although digital cameras in numerous formats are ubiquitous, such as DSLR cameras, cell phone cameras, etc., there has been a resurgence in photography using film cameras that produce analog images on film negatives. Since users enjoy the convenience of sharing digital images seamlessly with modern computing devices, the users of film cameras often digitize their film negatives and share the resulting digital image, such as by attaching it to a text or email or posting it via social media. However, when digitizing the film negatives to produce digital images, dust and scratches on the film negatives can cause undesirable artifacts on the digital images, such as dark spots, light spots, blurs, streaks, and the like. Dust refers to small, foreign bodies on the surface of the film negative, and a scratch refers to missing material from the film negative.

Conventional artifact correction systems may not be suitable to digitize film negatives, since they may not work properly for black-and-white images and can be costly and inefficient to use. For example, dedicated film scanners typically rely on infrared technologies to detect dust and scratch on film negatives, and the infrared technologies generally fail for black-and-white film negatives. Moreover, due to their cost, dedicated film scanners typically reside at professional photography labs rather than consumers' homes, making their use inefficient for many consumers.

Consequently, users often digitize their film negatives with a digital camera, such as by capturing a digital image from a film negative with a DSLR camera or a camera integrated into a cell phone, and then rely on artifact correction systems that process the digital image to correct artifacts caused by dust and scratches on the film negative. However, conventional artifact correction systems often degrade the quality of the digital image when correcting dust and scratch artifacts, such as by introducing blurriness and reducing the sharpness of the digital image. Moreover, conventional artifact correction systems are often manual in their operation, facilitating a user to manually identify and correct each dust and scratch artifact in a digital image.

However, these conventional artifact correction systems are simply not practical for applications having vast numbers of digital images with significant numbers of dust and scratch artifacts in each digital image, such as when processing a sequence of digital images corresponding to image frames of a vintage movie reel. In these applications, an automated workflow is required, since the vast amount of data to be processed simply cannot be manually done by a human. As an example, a one hour film shot at 24 frames per second includes over 86,000 image frames, and it would take a user nearly six years to manually correct dust and scratch artifacts in the digital images corresponding to the image frames if the user manually corrected 40 digital images per day, every day. For modern feature lengths of two hours and frame rates of 60 frames per second, it would take the same user nearly 30 years to manually correct dust and scratch artifacts in the digital images.

Accordingly, systems, devices, and techniques are described herein for correcting dust and scratch artifacts in digital images. A training system is implemented to train a neural network to detect and correct artifacts in digital images, such as artifacts caused by dust and scratches on a film negative used to generate a digital image. The training system can generate training digital images to train the neural network by combining content of clean digital images with content of synthetic digital images. For instance, the training system can generate synthetic digital images that depict synthetic dust artifacts and synthetic scratch artifacts, such as black-and-white images having white pixels that denote the presence of the synthetic dust and scratch artifacts and black pixels that denote the absence of the synthetic dust and scratch artifacts. The training system can obtain clean digital images that depict scenes and are free of artifacts caused by dust and scratches, and combine the content of clean digital images with the content of the synthetic digital images to form the training digital images that depict the scenes represented by the clean digital images and have the synthetic dust and scratch artifacts of the synthetic digital images. The training system can then train a neural network using the training digital images as input to the neural network, and the clean digital images as ground truth.

In one example, the training system augments the clean digital images, the synthetic digital images, the training digital images, or combinations thereof to enhance the statistical diversity of the training data, maintain a persistence of excitation when updating the neural network, and prevent model overfitting. For example, the training system can resize, rotate, extract a patch from, or change the intensity level of one or more of the clean digital images, the synthetic digital images, and the training digital images when generating the training data. The training system can apply the augmentations randomly and by random amounts during training of the neural network. Accordingly, the training system can train a neural network to learn features of dust and scratch artifacts at different scales, unlike conventional training systems that use training data that is not augmented as described.

Additionally or alternatively, to enhance the performance of the neural network for real-world images, the training system can use training digital images made up of pairs of manually-corrected, real-world digital images, e.g., pairs of "before" images and "after" images. The "before" images include real-world digital images having dust and scratch artifacts, such as digital images that have been digitized from film negatives of real-world scenes, and the "after" images have the dust and scratch artifacts manually corrected by expert users. The training system can then train a neural network using the "before" images as input to the neural network, and the "after" images as ground truth.

In one example, the training system trains a generative-adversarial neural network (GAN) that includes a generator and a discriminator by adversarially training the generator against the discriminator. For instance, the training system can train the generator to generate reconstructed digital images that correct dust and scratch artifacts of the training digital images by reducing the visibility of the dust and scratch artifacts in the reconstructed digital images compared to the training digital images. The generator can generate feature maps from the training digital images that represent features of the dust and scratch artifacts and features of the scenes depicted in the training digital images, and generate the reconstructed digital images from the feature maps.

The discriminator generates probabilities of digital images input to the discriminator being "true" real-world digital images, compared to "fake" reconstructed digital images generated by the generator, and the training system trains the discriminator to distinguish between the reconstructed digital images generated by the generator and the real-world digital images based on the generated probabilities. Thus, the generator and discriminator are adversarially trained because the generator is trained to generate reconstructed digital images that can fool the discriminator, and the discriminator is trained to determine "fake" reconstructed digital images generated by the generator from "true" real-world world digital images. By adversarially training the generator against the discriminator, the generator learns to generate better digital images to fool the discriminator, and the discriminator learns to better distinguish between "true" and "fake" digital images.

Because the generator of the GAN can generate a reconstructed digital image from a digital image input to the GAN, the GAN can be configured as an image-to-image network that scales with image resolution of the input digital image. Hence, the GAN can receive an input digital image having any suitable resolution (e.g., number and layout of pixels), and the reconstructed digital image output from the GAN can have the same resolution as the input digital image. Generally, conventional artifact correction systems do not scale with image resolution of the input digital image, and instead produce a digital image having a fixed, pre-determined resolution. Hence, by using the GAN, operation of a computing device that implements the GAN is improved compared to the operation of computing devices implementing conventional artifact correction systems.

To train the GAN, the training system updates coefficients of the generator (e.g., convolution coefficients) based on a loss function, such as a loss function that includes a pixel loss term, a gradient loss term, a context loss term, and an adversarial loss term. The pixel loss term penalizes a norm of a difference between the reconstructed digital images generated by the generator and ground truth images, e.g., the clean digital images used to form the training digital images. The gradient loss term penalizes a norm of a difference between the gradient of the reconstructed digital images and the gradient of ground truth images. The gradients can be determined separately over horizontal and vertical axes of the digital images, and the norms corresponding to the separate dimensions can be summed to form the gradient loss term. The context loss term penalizes a norm of a difference between features of the reconstructed digital images and features of the ground truth images. The features can be extracted from the digital images with a context extractor, such as a visual geometry group (VGG) convolutional neural network that can be implemented to extract feature maps at different layers of the VGG convolutional neural network. The adversarial loss term penalizes a function of the probabilities generated by the discriminator for inputs to the discriminator corresponding to the reconstructed digital images generated by the generator and the real-world digital images.

The training system updates coefficients of the discriminator (e.g., convolution coefficients) based on any suitable loss function, such as the adversarial loss term. In an example, the training system updates coefficients of the generator while coefficients of the discriminator are fixed (e.g., halted, or not updated), and updates coefficients of the discriminator while coefficients of the generator are fixed. For example, the training system can alternate between updating the generator and the discriminator on for different blocks of inputs until the loss function is below a loss threshold for a consecutive number of iterations.

Once trained, the training system provides the generator to an artifact correction system that can be installed on a client device to detect and correct artifacts in digital images, such as artifacts in user-provided digital images caused by dust and scratches on film negatives used to generate the digital images. The artifact correction system includes a user interface module implemented to receive a digital image that depicts a scene and includes at least one dust or scratch artifact. Using the pre-trained generator provided from the training system, the artifact correction system can generate a feature map from the digital image that represents features of the dust and scratch artifacts and features of the scene depicted in the digital image. The artifact correction system can configure the generator to generate, from the feature map, a reconstructed digital image that depicts the scene of the digital image and corrects the dust and scratch artifacts by reducing the visibility of the dust and scratch artifacts of the digital image. The user interface module can simultaneously display the digital image and the reconstructed digital image, so that the effects of the correction can be viewed in context.

In one example, the artifact correction system receives the digital image and additional digital images as a video sequence. For example, the digital images can each correspond to a digital image frame of a digital video sequence. The artifact correction system generates a feature map and a reconstructed digital image for each digital image of the video sequence automatically without user intervention required to manually correct dust and scratch artifacts. Hence, the artifact correction system is suitable to workflows having significant numbers of digital images, unlike conventional artifact correction systems that rely on tedious manual workflows that require multiple manual interactions with each digital image.

The artifact correction system is not limited to using a generator that generates reconstructed digital images, as described above. For example, the training system can train the GAN to generate artifact digital images that denote locations of dust and scratch artifacts in digital images. The training system, for instance, trains the generator to generate artifact digital images that indicate pixels of a digital image affected by dust or scratch artifacts and other pixels of the digital image unaffected by the dust and scratch artifacts, such as by using white pixels to indicate the affected pixels and black pixels to indicate the unaffected pixels. The training system trains the generator adversarially against the discriminator that is trained to distinguish between artifact digital images generated by the generator and other artifact digital images not generated by the generator.

Accordingly, the artifact correction system can receive a generator from the training system that is pre-trained to generate an artifact digital image from a digital image, the artifact digital image indicating locations of dust and scratch artifacts on the digital image. The artifact correction system can receive a digital image via the user interface module that depicts a scene and includes at least one dust or scratch artifact. The artifact correction system can then generate, with a generator provided from the training system, a feature map from the digital image that represents features of the dust and scratch artifacts and features of the scene in the digital image. The artifact correction system then configures the generator to generate, from the feature map, an artifact digital image that indicates pixels of the digital image affected by the dust and scratch artifacts and additional pixels of the digital image unaffected by the dust and scratch artifacts. Based on the artifact digital image, the artifact correction system generates a reconstructed digital image that depicts the scene of the digital image and corrects the dust and scratch artifacts by reducing visibility of the dust and scratch artifacts in the reconstructed digital image compared to the digital image.

Although the systems, devices, and techniques described herein generally describe correcting dust and scratch artifacts in digital images caused by dust and scratches on film negatives used to generate the digital images, the systems, devices, and techniques described herein are not so limited. Rather, the systems, devices, and techniques described herein can be used to correct artifacts in digital images caused by various sources, such as "hot pixels" caused by over exposure, artifacts caused by sensor dust (e.g., dust on the sensor of a digital camera used to capture a digital image), artifacts caused by dust on the lens of a camera (e.g., a film camera or a digital camera), debris on a hard-copy of an image, such as a piece of paper, from which a digital image is generated, and the like. As an example, the training system can generate synthetic digital images that depict synthetic artifacts representing one or more of hot pixels, sensor dust, lens dust, or debris on a paper image. Examples of the synthetic digital images include black-and-white images having white pixels that denote the presence of the synthetic artifacts and black pixels that denote the absence of the synthetic artifacts. The training system can generate training digital images by combining content of clean digital images (as described above) with the content of the synthetic digital images, and then train a neural network based on the training digital images, such as by inputting the training digital images to a generator of the neural network and updating coefficients of the generator by comparing reconstructed digital images generated by the generator to the clean digital images used to construct the training digital images. Hence, the artifact correction system can receive a pre-trained neural network from the training system that is trained to correct any suitable type of artifact in a digital image, including hot pixel artifacts, sensor dust artifacts, lens dust artifacts, paper debris artifacts, and the like.

Term Examples

"'After' image" describes an image of a pair of images that can be used to train a neural network. Each pair of images can include a "before" image, such as a real-world digital image that can have dust or scratch artifacts caused by dust or scratch on a film negative used to generate the "before" image. The "after" image can be generated from the "before" image by manually correcting the dust and scratch artifacts in the "before" image, such as by a trained expert user. The "before" image can be used as an input to the neural network, and the "after" image as ground truth, to train the neural network.

"Artifact" describes a blemish or undesired remnant on a digital image. Examples of artifacts on a digital image can include dust and scratch artifacts caused by dust and scratches on a film negative used to generate the digital image, such as streaks, dark spots, light spots, opacity gradients, blurry regions, etc., on the digital image. Other examples of artifacts include hot pixels (e.g., over-exposed pixels), and spots or blurriness caused by dust on a camera lens or a sensor of a digital camera, or debris on a hard-copy of an image (e.g., paper, glass, metal, etc.) from which the digital image is captured.

"Artifact digital image" describes a digital image that denotes locations of artifacts, such as dust and scratch artifacts, in a digital image. An artifact digital image can be a binary image, such as a black-and-white image that indicates pixels of a digital image affected by dust and scratch artifacts with white, and additional pixels of the digital image unaffected by the dust and scratch artifacts by black. In one example, a generator generates an artifact digital image as having a same resolution as a digital image input to the generator used to generate the artifact digital image. A reconstructed digital image that depicts the scene of the digital image and reduces the visibility of the artifacts compared to the digital image can be generated from the artifact digital image and the digital image.

"'Before' image" describes an image of a pair of images that can be used to train a neural network. Each pair of images can include a "before" image, such as a real-world digital image that can have dust or scratch artifacts caused by dust or scratch on a film negative used to generate the "before" image. The "after" image can be generated from the "before" image by manually correcting the dust and scratch artifacts in the "before" image, such as by a trained expert user. The "before" image can be used as an input to the neural network, and the "after" image as ground truth, to train the neural network.

"Clean digital image" describes a digital image that depicts a scene and is free of artifacts, such as dust and scratch artifacts. A clean digital image can be a real-world digital image captured with a digital camera, such as an outdoor landscape, sunset, ocean, etc., or a scanned film negative. A clean digital image can be used as a ground truth image when training a neural network to correct dust and scratch artifacts in digital images. Content of a clean digital image can be combined with content of a synthetic digital image to form a training digital image that is input to the neural network to train the neural network.

"Digital medium environment" describes any combination of the various computing devices and resources that can be utilized to implement the techniques, systems, and devices described herein. For instance, a digital medium environment can include at least one or more client computing devices, a network, and one or more server computing devices.

"Discriminator" describes a neural network that can be part of a generative adversarial network (GAN) that includes a generator and the discriminator that are adversarially trained against one another. Generally, the generator can be trained to generate any suitable type of digital image, such as a reconstructed digital image that corrects dust and scratch artifacts, or an artifact digital image that denotes locations of the dust and scratch artifacts. The discriminator can be jointly trained to distinguish between digital images generated by the generator and digital images that are not generated by the generator. In one example, the discriminator includes a convolutional neural network that can receive a digital image generated by the generator or a digital image that is not generated by the generator. The discriminator can then generate a probability that the input image to the generator is "true" (e.g., a digital image not generated by the generator), rather than "fake" (e.g., a digital image that is generated by the generator).

"Dust" describes any foreign debris, such as small particles on a film negative that are not considered part of the film negative. Dust on a film negative can cause dust artifacts on a digital image captured from the film negative, such as undesired spots and streaks.

"Dust or scratch artifact" describes a blemish on a digital image caused by dust or scratches, such as dust or scratches on a film negative used to generate the digital image. Dust or scratch artifacts can manifest as streaks, dark spots, light spots, opacity gradients, blurry regions, etc., on the digital image.

"Feature map" describes a map, vector, image, matrix, data structure, and the like that represents low-level features extracted from a digital image, such as color descriptions, object descriptions, lighting, lines, curves, shapes, primitives, gradients, textures, opacity, intensity, smoothness, displayed text, relative positioning between objects, etc. A neural network can be configured to reconstruct a digital image from the feature map of the digital image.

"Generator" describes a neural network that can be part of a generative adversarial network (GAN) that includes the generator and a discriminator that are adversarially trained against one another. The generator can be trained to generate a feature map from an input digital image that is input to the generator, and generate a digital image from the feature map, such as a reconstructed digital image or an artifact digital image. The discriminator can be trained to distinguish between digital images generated by the generator and digital images that are not generated by the generator.

"Generative adversarial network", or GAN, describes a neural network that includes a generator and a discriminator that are adversarially trained against one another. Generally, the generator can be trained to generate a digital image and the discriminator can be jointly trained to distinguish between digital images generated by the generator and digital images that are not generated by the generator. The discriminator can receive a digital image generated by the generator or a digital image that is not generated by the generator, and generate a probability that the input image to the discriminator is "true" (e.g., a digital image not generated by the generator, such as a real digital image captured with a digital camera), rather than "fake" (e.g., a digital image that is generated by the generator). By adversarially training the generator against the discriminator, the generator learns to generate better digital images to fool the discriminator, and the discriminator learns to better distinguish between "true" and "fake" digital images.

"Loss function" describes any suitable cost function that can be optimized to adjust coefficients of an adaptive system, such as convolution coefficients of a neural network. For instance, convolution coefficients of the neural network can be adjusted to minimize a loss function. In one example, a loss function includes a pixel loss term, a gradient loss term, a context loss term, and an adversarial loss term. The pixel loss term can measure a difference between a reconstructed digital image generated by a generator and a ground truth image. A gradient loss term can measure a difference between a gradient of the reconstructed digital image and a gradient of the ground truth image. A context loss term can measure a difference between features extracted from the reconstructed digital image and features extracted from the ground truth image. An adversarial loss term can measure a function of probabilities generated by a discriminator for inputs corresponding to digital images generated by a generator (e.g., "fake" digital images) and inputs corresponding to digital images not generated by the generator (e.g., "true" real-world digital images).

"Real digital images" describes "true" digital images that are not generated by a generator of a GAN, and instead include real-world digital images, such as digital images captured with a digital camera of a portrait of a person, a landscape scene, and the like.

"Real-world digital image" describes digital images captured with a camera, including digital images generated by digitizing a film negative, digital images captured with a digital camera of a real-world scene (e.g., a portrait of a person, a landscape scene, etc.), and the like.

"Reconstructed digital image" describes a digital image generated by a neural network, e.g., a generator of a GAN, based on a digital image input to the neural network that depicts a scene and includes an artifact, such as a dust or scratch artifact. The reconstructed digital image can depict the scene of the digital image input to the neural network, and correct the artifact by reducing the visibility of the artifact.

"Scene" describes real-world content of an image, such as a mountain landscape or portrait of a person captured by a digital camera.

"Scratch" describes missing material from a surface, such as a film negative. For instance, a scratch on a film negative can remove some of the chemical compounds making up the surface of the film negative, thus removing some of the content captured by the film negative.

"Synthetic digital image" describes digital images that depict synthetic artifacts, such as synthetic dust artifacts and synthetic scratch artifacts. The synthetic digital image can be generated by a training system to train a neural network to correct dust and scratch artifacts in digital images. For example, the training system can generate synthetic digital images as back-and-white digital images having one of the black or the white denote the synthetic artifacts, and the other of the black or the white denote an absence of the synthetic artifacts. The training system can then combine the content of the synthetic digital images with content of clean digital images (e.g., scanned film negatives that depict scenes and are free of artifacts caused by dust and scratches) to form training digital images that model the effects of dust and scratches on film negatives when digital images are captured from the film negatives.

"Training digital image" describes a digital image suitable to train a neural network to correct dust and scratch artifacts by reducing the visibility of the dust and scratch artifacts. Training digital images can include ground truth images known to be true, e.g., free of dust and scratch artifacts, and can represent an expected output of a neural network. In one example, a training system generates training digital images that are input to a neural network to train the neural network, by comparing the reconstructed digital images generated by the neural network to the ground truth images. The training system can generate training digital images by combining content of clean digital images that depict scenes and are free of dust and scratch artifacts and content of synthetic digital images that do not depict scenes, but instead depict synthetic artifacts, such as synthetic dust artifacts and synthetic scratch artifacts. Additionally or alternatively, the training digital images can include pairs of input/output images as "before" images and "after" images, as described above.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ the techniques described herein. As used herein, the term "digital medium environment" refers to the various computing devices and resources that can be utilized to implement the techniques described herein. The illustrated digital medium environment 100 includes a computing device 102 depicted as a desktop computer, which is an example computing device. Computing device 102 generally includes any suitable type of computing device, such as a client computing device, a mobile phone, tablet, laptop computer, desktop computer, goggles, glasses, digital camera, digital assistant, image editor, non-linear editor, copier, scanner, and the like.

Notably, the computing device 102 includes any suitable number of computing devices, such as one or more computing devices, (e.g., a smart phone connected to a tablet). Furthermore, discussion of one computing device of the computing device 102 is not limited to that one computing device, but generally applies to each of the computing devices included in the computing device 102. Additionally or alternatively, the computing device 102 can be representative of one or a plurality of different devices connected to a network that perform operations "over the cloud" as further described in relation to FIG. 9. In one example, the computing device 102 includes multiple computing devices communicatively coupled to each other, such as with a low power wireless communication standard (e.g., a Bluetooth® protocol). Hence, an asset (e.g., digital image, video clip, text, drawing, artwork, document, file, and the like) generated, processed, edited, or stored on one device of the computing device 102 (e.g., a desktop computer) can be communicated to, and displayed on and processed by another device of the computing device 102 (e.g., a tablet).

The computing device 102 includes an artifact correction system 104 for correcting dust and scratch artifacts in digital images. The artifact correction system 104 includes computer-readable storage media 106, which includes any suitable application for correcting dust and scratch artifacts in digital images, such as artifact correction application 108. The computer-readable storage media 106 can include any suitable type of storage accessible by or included in the artifact correction system 104. The computer-readable storage media 106 stores data and provides access to and from memory included in the computer-readable storage media 106 for any suitable type of data. For instance, the computer-readable storage media 106 includes data used by or generated by the artifact correction application 108. The computer-readable storage media 106 also includes or have access to any suitable data for correcting dust and scratch artifacts in digital images, such as neural networks (e.g., architecture definitions and coefficients), feature maps, probabilities a digital image is "true" or "fake", values of thresholds, training digital images, reconstructed digital images, artifact digital images, loss functions, and the like.

The artifact correction system 104 also includes one or more processors 110, which include any suitable type of processor, such as a graphics processing unit, central processing unit, digital signal processor, processor core, combinations thereof, and the like. Hence, the artifact correction system 104 can be implemented at least partially by executing instructions stored in the computer-readable storage media 106 on the processors 110. For instance, the processors 110 can execute portions of the artifact correction application 108.

Furthermore, the artifact correction system 104 includes a transceiver module 112, which is implemented to transmit and receive data using any suitable type and number of communication protocols. For instance, data within the artifact correction system 104 can be transmitted to a server with the transceiver module 112. Furthermore, data can be received from a server with the transceiver module 112. The transceiver module 112 can also transmit and receive data between computing devices of the computing device 102. In one example, transceiver module 112 includes a low power wireless communication standard (e.g., a Bluetooth® protocol) for communicating data between computing devices of the computing device 102.

The computing device 102 is also coupled to a network 114, which communicatively couples the computing device 102 with a server 116. The network 114 can include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof. In one example, the computing device 102, the network 114, and the server 116 are integrated into one or more collocated computing devices. For instance, the computing device 102 can include the network 114 and the server 116.

The server 116 can include one or more servers or service providers that provide services, resources, assets, or combinations thereof to the computing device 102. Services, resources, or assets may be made available from the server 116 to the artifact correction system 104, and stored at assets 118 of the server 116. For instance, training digital images, real-world digital images, synthetic digital images, neural networks (e.g., convolution coefficient values, definitions of architectures, interconnects, filter sizes etc.), video sequences of digital image frames, image editing applications, etc. in part or in whole can be stored at the assets 118 and made available to the computing device 102. Hence, the artifact correction system 104 can include any suitable asset stored at the assets 118 of the server 116.

The server 116 includes a training system 120 that can be implemented to train a neural network to correct dust and scratch artifacts in digital images by reducing the visibility of the dust and scratch artifacts. The training system 120 includes a training data generation module 122 that is implemented to generate the training data 124, such as training digital images as described above. For instance, the training data 124 includes training digital images, clean digital images, synthetic digital images, combinations of content of the clean digital images with content of the synthetic digital images, pairs of "before" images and "after" images, artifact digital images, and the like.

The training system 120 also includes a neural network module 126 that can be implemented to receive the training data 124 from the training data generation module 122 and use the training data 124 to train a neural network included in the neural network module 126, such as a GAN that includes a generator and a discriminator that are adversarially trained against one another. Accordingly, the neural network module 126 can evaluate a loss function based on any suitable data used by or generated by the training system 120, such as reconstructed digital images generated by the generator, probabilities generated by the discriminator, ground truth digital images, features extracted from digital images, and the like.

Once the training system 120 trains a neural network to correct dust and scratch artifacts, the server 116 can provide a trained neural network 128 to the computing device 102. In one example, the trained neural network 128 includes a pre-trained generator of a GAN that is trained via the training system 120. Additionally or alternatively, the trained neural network 128 includes a discriminator of a GAN that is trained via the training system 120. Since the discriminator may not be needed in a client device to correct dust and scratch artifacts in user-provided digital images (e.g., since the discriminator can be used in a training mode and not in a deployment mode), the discriminator included in the trained neural network 128 can be disabled so that it does not function.

The artifact correction system 104 of the computing device 102 can be implemented to receive the trained neural network 128 and use it to correct dust and scratch artifacts in digital images. For example, the digital image 130 depicts a scene and includes dust and scratch artifacts 132 that are enclosed within the dashed ellipses for clarity. In one example, the dust and scratch artifacts 132 are caused by dust and scratches on a film negative that is photographed with a digital camera to generate the digital image 130. The dust and scratch artifacts 132 are generally manifested in the digital image 130 as light spots and streaks.

The digital image 130 is input to the artifact correction system 104, which generates the reconstructed digital image 134 from the digital image 130. For example, the artifact correction system 104 generates, with a generator of the trained neural network 128, a feature map from the digital image 130 that represents features of the dust and scratch artifacts 132 and features of the scene depicted in the digital image 130. Based on the feature map, the artifact correction system 104 generates the reconstructed digital image 134 with the generator, such as by filling pixels of the reconstructed digital image 134 corresponding to the dust and scratch artifacts 132 with pixel content of patches of the digital image 130 determined automatically and without user intervention from the feature map generated by the generator. Hence, the artifact correction system 104 corrects the dust and scratch artifacts 132 of the digital image 130 by generating the reconstructed digital image 134 that reduces the visibility of the dust and scratch artifacts 132 in the reconstructed digital image 134 compared to the digital image 130.

Accordingly, the training system 120 and the artifact correction system 104 can be implemented to correct dust and scratch artifacts in digital images when conventional artifact correction systems fail, or are extremely inefficient to use. For example, the training system 120 and the artifact correction system 104 are suitable for correcting dust and scratch artifacts in digital images captured from film negatives, including color and black-and-white film negatives, digital images making up video frames of a video sequence, such as digital images captured from individual film frames of an analog film, and the like.

Example Training System

Figure 2:
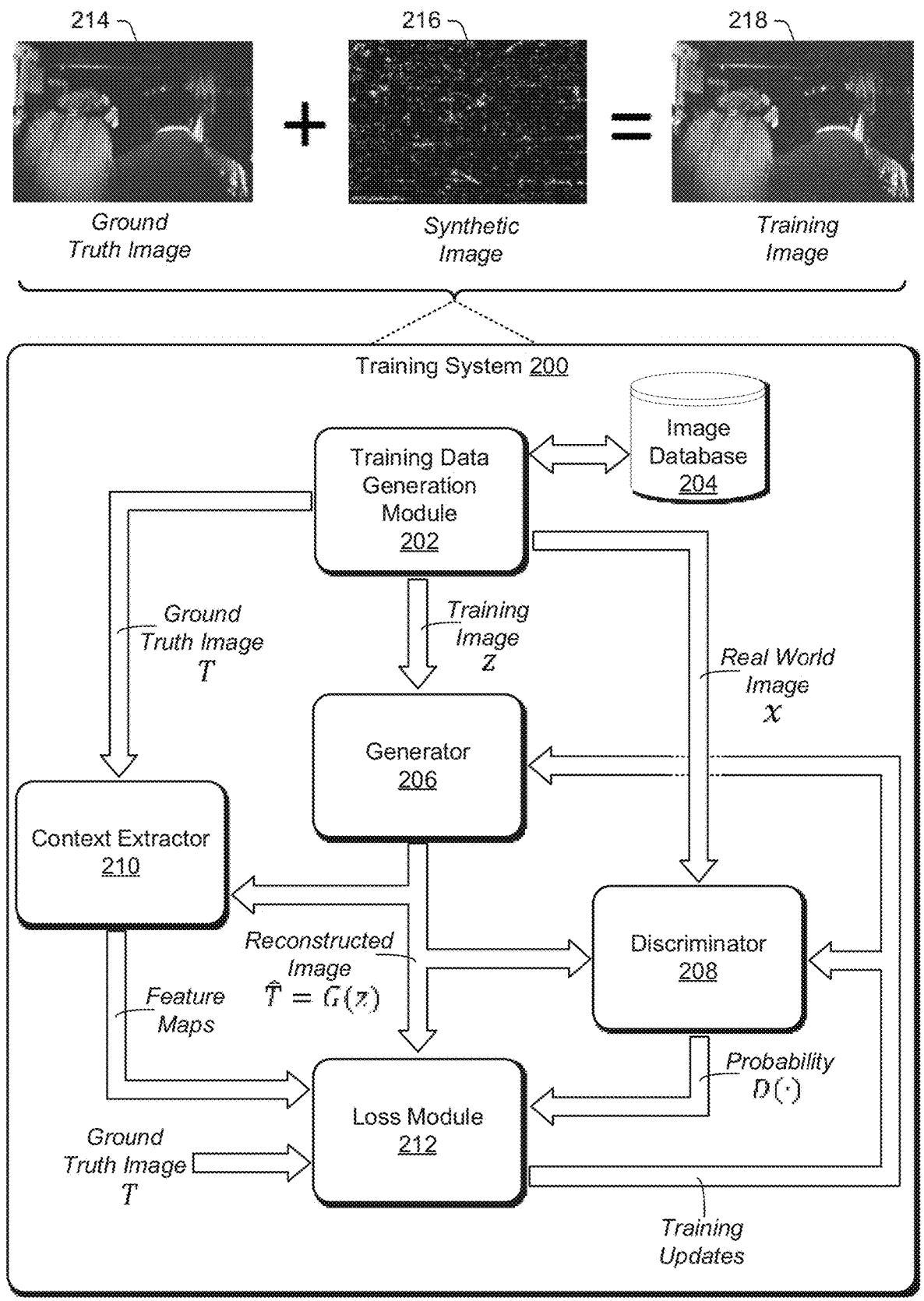
FIG. 2 illustrates an example training system in accordance with one or more aspects of the disclosure.
Figure 3:
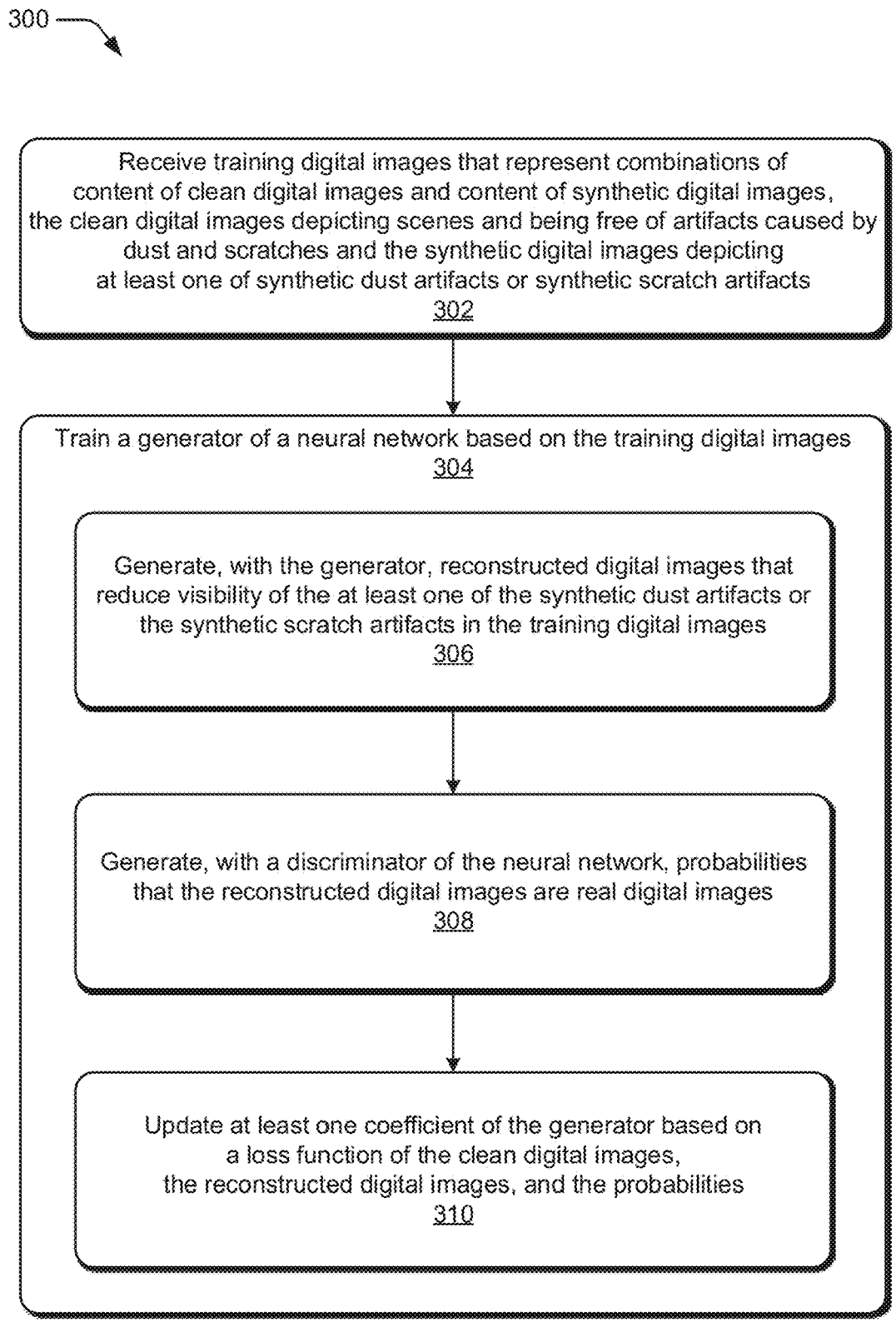
FIG. 3 illustrates a flow diagram depicting an example procedure in accordance with one or more aspects of the disclosure.

FIG. 2 illustrates an example training system 200 in accordance with one or more aspects of the disclosure, and FIG. 3 illustrates a procedure 300 in accordance with one or more aspects of the disclosure. Aspects of the procedure 300 can be implemented in hardware, firmware, software, or a combination thereof. The procedure 300 is shown as a set of blocks that specify operations performed by one or more devices and are not necessarily limited to the orders shown for performing the operations by the respective blocks. FIG. 2 and FIG. 3 are next described together, with references made to the modules of FIG. 2 that can implement the operations of FIG. 3.

In the implementation of FIG. 2, the training system 200 includes training data generation module 202, image database 204, generator 206, discriminator 208, context extractor 210, and loss module 212. These modules and blocks can be implemented as any type of module or component in software (e.g., as software instructions that are executable with a processing system), hardware, or combinations thereof, as a standalone application, as a module or component of another device application, a plug-in module to the computing device, and in any type of computing device. The training system 200 is one example of the training system 120 constructed using these modules. For instance, signals can be redefined, and modules can be modified, combined, divided, added, or removed to form a modified system, without altering the functionality of the training system 200. Accordingly, such modified systems are considered to be within the scope of the disclosure. Furthermore, for simplicity, the training system 200 is limited to these modules and a description of some of their interconnects. The training system 200 can, however, include any suitable signals and communications between modules omitted for simplicity. Such signals can include system clocks, counters, digital image indicators, sequence indicators, reset signals, and the like.

The training system 200 can be implemented on any suitable device or devices. In one example, the training system 200 is implemented on one computing device (e.g., the server 116 in FIG. 1). In another example, the training system 200 is implemented on more than one computing device. For instance, parts of the training system 200 can be implemented by a first computing device, such as the computing device 102 in FIG. 1, and other parts of the training system 200 can be implemented by an additional computing device, such as the server 116.

The training data generation module 202 can be implemented to generate training digital images and provide the training digital images to the training system 200 to train a neural network that includes the generator 206 and the discriminator 208. In an example, the training data generation module 202 generates training digital images by combining content of clean digital images and content of synthetic digital images (block 302). For instance, the training data generation module 202 can obtain clean digital images from the image database 204, such as clean digital images that depict scenes and are free of artifacts caused by dust and scratches, and generate synthetic digital images that depict synthetic dust artifacts, synthetic scratch artifacts, or both depict synthetic dust artifacts and synthetic scratch artifacts. The training data generation module 202 then combines the content of the clean digital images with the content of the synthetic digital images to form training digital images. In an example, the training data generation module 202 generates the training digital images and stores the training digital images in the image database 204, so that the training digital images can be retrieved from the image database 204 when training the generator 206 and the discriminator 208.

Digital image 214 is an example of a clean digital image that can serve as ground truth when training the generator 206, and that has content that depicts a scene and is free of artifacts caused by dust and scratches. The synthetic digital image 216 depicts synthetic dust artifacts and synthetic scratch artifacts, and is an example of a synthetic digital image that is generated by the training data generation module 202 and stored at the image database 204. In one example, the training data generation module 202 generates the synthetic digital images as back-and-white digital images having one of the black or the white denote the synthetic dust artifacts and the synthetic scratch artifacts, and the other of the black or the white denote an absence of the synthetic dust artifacts and the synthetic scratch artifacts. For instance, synthetic digital image 216 depicts the synthetic dust artifacts and synthetic scratch artifacts as white pixels, with the black pixels denote an absence of the synthetic dust artifacts and synthetic scratch artifacts.

The training data generation module 202 combines the content of the digital image 214 (e.g., the scene depicted by the digital image 214) with the content of the synthetic digital image 216 (e.g., the synthetic dust artifacts and the synthetic scratch artifacts) to form the training digital image 218, which depicts the scene of the digital image 214 and includes the synthetic dust artifacts and the synthetic scratch artifacts. For instance, pixels of the training digital image 218 that correspond to the black pixel locations of the synthetic digital image 216 include the pixel content of the digital image 214 unaffected by the synthetic digital image 216. However, pixels of the training digital image 218 that correspond to the white pixel locations of the synthetic digital image 216 include the pixel content of the digital image 214 that is combined with the pixel content of the synthetic digital image 216, such as by blending, merging, or over-writing the pixel content of the digital image 214 with the pixel content of the synthetic digital image 216. Hence, the training data generation module 202 generates training digital images that include a combination of scenes of clean digital images and synthetic dust artifacts or synthetic scratch artifacts of synthetic digital images. The training system 200 can use the training digital images as input to the generator 206, and the clean digital images as ground truth images for training the generator 206.

Additionally or alternatively, the training data generation module 202 receives training digital images from the image database 204 as pairs of digital images that include "before" images and "after" images. The "before" images correspond to real-world digital images that include dust and scratch artifacts (e.g., digital images captured with a digital camera from film negatives that have dust or scratches), and the "after" images correspond to the "before" images that have been manually edited to correct the dust and scratch artifacts, such as manually corrected by expert users. The training system 200 can use the "before" images as training digital images input to the generator 206, and the "after" images as ground truth images for training the generator 206. Hence, the training data generation module 202 can receive training digital images that include synthetically-generated digital images, real-world digital images, or combinations thereof.

In one example, the training data generation module 202 augments one or more of the clean digital images, the synthetic digital images, or the training digital images. For example, the training data generation module 202 adjusts at least one of a size, a rotation, or an intensity of one or more of the clean digital images, the synthetic digital images, or the training digital images. The training data generation module 202 can resize a digital image including to extract a patch of the digital image.

In an example, the training data generation module 202 augments synthetic digital images, such as the synthetic digital image 216, by at least one of resizing the synthetic digital images, rotating the synthetic digital images, or changing an intensity of the synthetic digital images to form augmented synthetic digital images. The training data generation module 202 then combines content of the augmented synthetic digital images with content of clean digital images to generate the training digital images.

Additionally or alternatively, the training data generation module 202 augments clean digital images (e.g., the digital image 214) by at least one of resizing the clean digital images, rotating the clean digital images, or extracting patches of the clean digital images to form augmented clean digital images. The training data generation module 202 then combines content of the augmented clean digital images with the content of synthetic digital images to generate the training digital images.

By resizing digital images, the training system 200 trains the generator 206 to learn features of dust and scratch artifacts in digital images at different scales, which may not be possible for conventional systems that do not adjust the size of digital images used to train a neural network. Hence, a generator trained by the training system 200 can detect and correct the dust and scratch artifacts better than the conventional systems, such as by making the dust and scratch artifacts less visible than the conventional systems.

The training system 200 trains the generator 206 based on the training digital images (block 304). The training data generation module 202 provides ground truth images denoted by T to the context extractor 210 and the loss module 212. Examples of ground truth images T include clean digital images depicting scenes and being free of artifacts caused by dust and scratches that are used to generate the training digital images, such as the digital image 214, and "after" images generated by manual correction of "before" images. The training data generation module 202 provides the training digital images denoted by z to the generator 206. Examples of the training digital images z include the training digital image 218 and "before" images corresponding to the "after" images prior to manual correction.

The training data generation module 202 can obtain real-world digital images from the image database 204. For example, the real-world digital images, denoted by x, include digital photographs that do not include dust and scratch artifacts, and that have not been generated by the generator 206, such as real-world digital images taken from real-world scenes with a digital camera. For instance, a user may point a digital camera at an outdoor landscape to capture a real-world digital image of the landscape. The training data generation module 202 provides the real-world digital images x to the discriminator 208.

The generator 206 and the discriminator 208 can be included in a GAN that is adversarially trained by the training system 200, and the generator 206 can receive training digital images, denoted as z, from the training data generation module 202. The generator 206 is implemented to generate reconstructed digital images, denoted as $\hat{T}=G(z)$, where $G(\cdot)$ denotes the generator 206 operation, from the training digital images z (block 306). The reconstructed digital images correct the dust and scratch artifacts of the training digital images by reducing the visibility of the dust and scratch artifacts in the reconstructed digital images compared to the dust and scratch artifacts in the training digital images.

The generator 206 includes any suitable generator for generating reconstructed digital images that reduce visibility of dust and scratch artifacts in the training digital images. For instance, the generator 206 generates one or more feature maps from a training digital image that represents features of dust and scratch artifacts and features of the scene depicted in the training digital image input to the generator 206. The features can include any suitable low-level features, such as color descriptions, object descriptions, lighting, lines, curves, shapes, primitives, gradients, textures, opacity, intensity, smoothness, displayed text, relative positioning between objects, etc. Based on the feature map, the generator 206 generates a reconstructed digital image. In one example, the generator 206 includes an encoder to generate a feature map, and a decoder to generate the reconstructed digital image from the feature map. Additionally or alternatively, the generator 206 includes dilated residual blocks that include a channel attention mechanism to weight the features from different convolutional layers and account for information at different scales.

Figure 4:
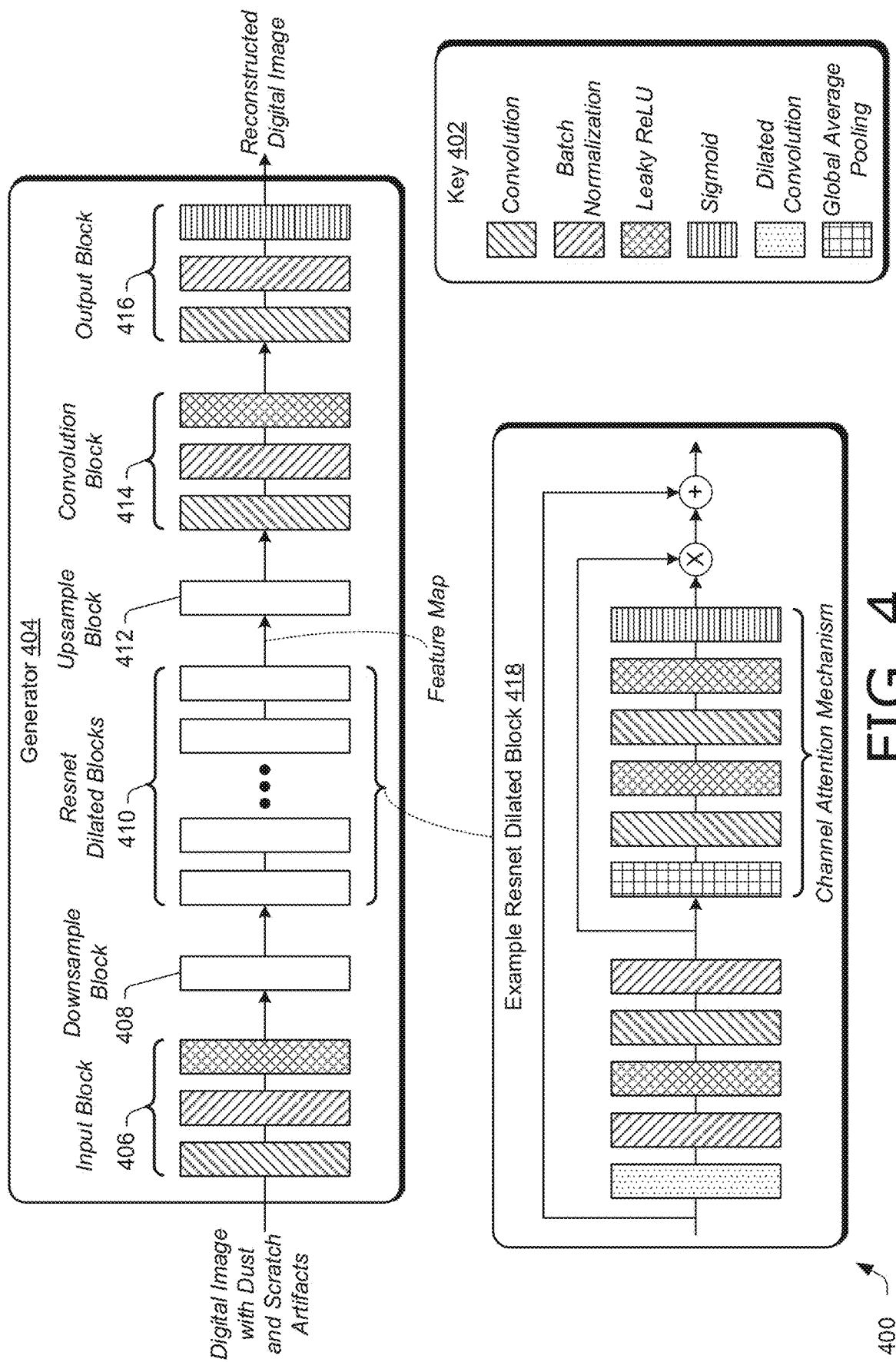
FIG. 4 illustrates an example generator system usable for correcting dust and scratch artifacts in digital images in accordance with one or more aspects of the disclosure.

For example, FIG. 4 illustrates an example generator system 400 usable for correcting dust and scratch artifacts in digital images in accordance with one or more aspects of the disclosure. The generator system 400 depicts a key 402 that denotes the types of blocks making up the generator 404, which is an example of the generator 206 in FIG. 2. For instance, the training system 200 can train the generator 404 adversarially against the discriminator 208 in FIG. 2. The generator 404 includes an input block 406, a downsample block 408, resnet dilated blocks 410, an upsample block 412, a convolution block 414, and an output block 416.

The input block 406 includes a convolution layer followed by a batch normalization layer, which is followed by a leaky ReLU layer that includes leaky rectified linear units. The input block 406 can be implemented to receive a digital image of any suitable resolution W×H×3, where W denotes the number of pixels in a horizontal dimension and H denotes the number of pixels in a vertical dimension for three color channels, such as red, green, and blue color channels representing an RGB color space, lightness, green-red, and blue-yellow color channels representing a LAB color space, etc. The output block 416 can be implemented to generate a reconstructed digital image having the same resolution as the input image, W×H×3, so the generator 404 scales with input resolution.

The input block 406 is followed by the downsample block 408, which can be implemented to reduce the size of the input, and thus remove redundant information. The downsampled data from the input block 406 is provided to the resnet dilated blocks 410, which can include any suitable number of resnet dilated blocks to generate a feature map from the downsampled data. In one example, the resnet dilated blocks 410 include seven resnet dilated blocks sequentially connected, and that are each illustrated by the example resnet dilated block 418.

The example resnet dilated block 418 can be implemented to receive the input from a previous resnet dilated block of the resnet dilated blocks 410 (or from the downsample block 408 for the first one of the resnet dilated blocks 410), process the input with a dilated convolution layer, and provide the input to an adder at the output of the example resnet dilated block 418. The dilated convolution is followed by a batch normalization layer. By using batch normalization in the generator 404, the training of the generator 404 can be accelerated because the batch normalization generally can normalize the features for each convolutional channel based on the mean and variance of data over a batch of the data for the convolutional channel In the example resnet dilated block 418, the normalized data from the first batch normalization layer is processed by a leaky ReLU layer, followed by a convolution layer and another batch normalization layer whose output is provided to a multiplier of the example resnet dilated block 418 and a series of layers that are included in a channel attention mechanism of the example resnet dilated block 418.

The channel attention mechanism includes a global average pooling layer, a convolution layer, a leaky ReLU layer, another convolution layer, another leaky ReLU layer, and lastly a sigmoid layer that constrains the output to be within the range of zero to one. The output of the sigmoid is also provided to the multiplier of the example resnet dilated block 418. The channel attention mechanism guides the example resnet dilated block 418 to focus on informative components of the input data. For instance, generally a convolution layer operates with a local receptive field, and may not be able to exploit contextual information outside of the local region. By adding the channel attention mechanism, the example resnet dilated block 418 accounts for global spatial information to determine the importance of each channel and weight the features of the feature map to account for information at different scales. Hence, each block of data can be weighted according to its relative importance, and the generator 404 can be trained to learn details of the features at the different scales.

A feature map generated by the resnet dilated blocks 410 is provided to the upsample block 412, which generally is implemented to upsample by an amount corresponding to the downsample factor of the downsample block 408. The convolution block 414 receives the output of the upsample block 412 (e.g., an upsampled feature map), and includes a convolution layer, followed by a batch normalization layer, followed by a leaky ReLU layer. The output block 416 includes a convolution layer, a batch normalization layer, and a sigmoid layer, and generates a reconstructed digital image having the same resolution as the digital image input to the generator 404. The reconstructed digital image can depict a scene of the digital image input to the generator 404 and correct dust and scratch artifacts by reducing the visibility of the dust and scratch artifacts in the reconstructed digital image compared to the digital image input to the generator 404. For example, the convolution block 414 and the output block 416 can fill pixels of the reconstructed digital image corresponding to the dust and scratch artifacts with pixel content of patches of the digital image input to the generator 404 determined automatically and without user intervention from the feature map generated by the resnet dilated blocks 410.

Returning to FIGS. 2 and 3, the generator 206 provides reconstructed digital images, $\hat{T}=G(z)$, to the discriminator 208, the context extractor 210, and the loss module 212. The discriminator 208 can be implemented to receive reconstructed digital images, $\hat{T}=G(z)$, from the generator 206 and real-world digital images, x, from the training data generation module 202, and generate probabilities that digital images input to the discriminator are real digital images (block 308). For example, the training system 200 jointly trains the generator 206 and the discriminator 208 adversarially against one another, so that the generator 206 is trained to generate reconstructed digital images that reduce the visibility of dust and scratch artifacts and trick the discriminator 208 into determining that the reconstructed digital images are real digital images not generated by the generator. The training system 200 trains the discriminator 208 to distinguish between reconstructed digital images generated by the generator 206 from the real-world world digital images provided by the training data generation module 202.

Accordingly, the discriminator 208 generates a probability that a given digital image input to the discriminator 208 is a "true" or real digital image, rather than a "fake" or reconstructed digital image generated by the generator 206. The probability is denoted by the discriminator 208 operator D(•), and therefore ranges from zero to denote "fake", to one to denote "true". When training the discriminator 208, the training system 200 provides one of the reconstructed digital images, T=G(z), from the generator 206 or the real-world digital images, x, from the training data generation module 202 as input to the discriminator 208. When training the generator 206, the training system 200 provides the reconstructed digital images, $\hat{T}$=G(z), from the generator 206 as input to the discriminator 208.

The discriminator 208 includes any suitable architecture for generating the probabilities, such as a convolutional neural network. In one example, the discriminator 208 includes a fully convolution neural network having four convolutional layers denoted by $C_{64}$-$C_{128}$-$C_{256}$-$C_{512}$, where $C_i$ denotes a convolutional layer having i convolutions. The discriminator 208 provides the probabilities D(•) that the discriminator 208 generates to the loss module 212.

The context extractor 210 can be implemented to extract context from digital images and generate feature maps for the digital images. The context extractor 210 receives a ground truth image T from the training data generation module 202 and a reconstructed digital image $\hat{T}$ from the generator 206, and generates one or more feature maps for each of the images that the context extractor 210 receives. The loss module 212 uses the feature maps generated by the context extractor 210 to compare perceptual context between the ground truth images and the reconstructed digital images generated by the generator 206.

The context extractor 210 generates feature maps of a digital image for perceptual context in any suitable way. In one example, the context extractor 210 includes a pre-trained visual geometry group (VGG) convolutional neural network, such as a VGG-19 convolutional neural network that can be implemented to extract feature maps from digital images at different convolutional layers of the network. The context extractor 210 provides feature maps to the loss module 212.

The loss module 212 can be implemented to evaluate a loss function and provide training updates to update coefficients of the generator 206, the discriminator 208, or both the generator 206 and the discriminator 208 based on the loss function (block 310). The loss module 212 evaluates any suitable loss function, such as a loss function of ground truth images (e.g., clean digital images used to generate the training digital images, or "after" images, as described above), the reconstructed digital images generated by the generator 206, and the probabilities generated by the discriminator 208. In one example, the loss module 212 evaluates a loss function that includes a pixel loss term, a gradient loss term, a context loss term, and an adversarial loss term, and provides training updates to update coefficients of the generator 206 based on evaluating the loss function. Additionally or alternatively, the loss module 212 provides training updates to update coefficients of the discriminator 208 based on the adversarial loss term.

For instance, the loss module 212 can evaluate a loss function $\mathcal{L}$ that includes a linear combination of a pixel loss term, a gradient loss term, a context loss term, and an adversarial loss term, or $$\mathcal{L} = \lambda_1 \cdot L_{pix} + \lambda_2 \cdot L_{grad} + \lambda_3 \cdot L_{context} + \lambda_4 \cdot L_{adv}$$

where $L_{pix}$ denotes a pixel loss term, $L_{grad}$ denotes a gradient loss term, $L_{context}$ denotes a context loss term, and $L_{adv}$ denotes an adversarial loss term. The combining weights $\lambda_i$, i=1 . . . 4 are real-valued numbers. In one example, the loss module 212 determines the combining weights according to $\lambda_1$=1, $\lambda_2$=2, $\lambda_3$=1, and $\lambda_4$=0.01.

The loss module 212 uses any suitable pixel loss term $L_{pix}$, such as a pixel loss term determined from a distance between pixel content of a reconstructed digital image generated by the generator 206, $\hat{T}$, and pixel content of a ground truth image corresponding to the reconstructed digital image, T, such as $$L_{pix} = \|G(z) - T\| = \|\hat{T} - T\|$$

where $\|\cdot\|$ denotes any suitable norm, such as $\ell_1$, $\ell_2$, and the like.

The loss module 212 uses any suitable gradient loss term $L_{grad}$, such as a gradient loss term that penalizes a difference between edges of a reconstructed digital image generated by the generator 206, $\hat{T}$, and edges of a ground truth image corresponding to the reconstructed digital image, T. One example of a gradient loss term is $$L_{pix} = \|\nabla_x \hat{T} - \nabla_x T\| + \|\nabla_y \hat{T} - \nabla_y T\|$$

where $\nabla_x$ and $\nabla_y$ denote gradient operators over horizontal and vertical dimensions, respectively.

The loss module 212 uses any suitable measure of perceptual loss (e.g., loss based on user perception), to determine a context loss term $L_{context}$. In one example, a context loss term is determined from the feature maps generated by the context extractor 210 using a VGG-19 network. For example, the loss module 212 can determine a context loss term for the l-th convolution layer in the VGG-19 network according to $$L_{context,l} = \frac{1}{W_l \cdot H_l \cdot C_l} \cdot \sum_{x=1}^{W_l} \sum_{y=1}^{H_l} \sum_{z=1}^{C_l} \|\phi_l(\hat{T}) - \phi_l(T)\|$$

where $\phi_l$ denotes the feature map generated by the VGG-19 network for the l-th convolution layer and $W_l$, $H_l$, and $C_l$ denote the dimensions of the feature map. The loss module 212 can then determine a context loss term based on the loss terms determined from the individual layers of the VGG-19 network according to $$L_{context} = \omega_l \sum_l L_{context,l}$$

where $\omega_l$ denote balancing weights for the convolution layers of the VGG-19 network, and can be selected in any suitable way, such as between zero and one.

The loss module 212 uses any suitable adversarial loss term $L_{adv}$ to adversarially train the generator 206 against the discriminator 208. Since the discriminator 208 is provided as input a reconstructed digital image $\hat{T}$=G(z) generated by the generator 206 or a real-world digital image x provided from the training data generation module 202, the loss module 212 evaluates an adversarial loss term based on the probabilities generated by the discriminator 208. One example of an adversarial loss term is $$L_{ad}=-E_{x\in p_x}\{\log[D(x)]\}-E_{z\in p_z}\{\log[1-D(G(z))]\}$$

where $E\{\cdot\}$ denotes statistical expectation, $x\in p_x$ denotes the digital images input to the discriminator 208 taken from the distribution of real-world digital images x provided from the training data generation module 202, and $z\in p_z$ denotes digital images input to the discriminator 208 taken from the distribution of reconstructed digital images G(z) provided from the generator 206. When the training system 200 updates the discriminator 208, the adversarial loss term $L_{adv}$ can be evaluated over $x\in p_x$ and $z\in p_z$, since the discriminator 208 can receive reconstructed digital images G(z) and real-world digital images x. However, when the training system 200 updates the generator 206, the adversarial loss term $L_{adv}$ can be evaluated over $z\in p_z$, since the discriminator 208 can receive reconstructed digital images G(z) and not the real-world digital images x when updating the generator 206.

When the discriminator 208 receives a real-world digital image x and correctly generates a probability near one, or "true", the adversarial loss component $-E_{x\in p_x}\{\log[D(x)]\}$ is small or near zero. However, when the discriminator 208 incorrectly generates a probability near zero, or "fake", for a real-world digital image x, the adversarial loss component $-E_{x\in p_x}\{\log[D(x)]\}$ is a large number, thus penalizing the output generated by the discriminator 208. Similarly, when the discriminator 208 receives a reconstructed digital image G(z) and correctly generates a probability near zero, or "fake", the adversarial loss component $-E_{z\in p_z}\{\log[1-D(G(z))]\}$ is small or near zero. However, when the discriminator 208 generates a probability near one, or "true", for a reconstructed digital image G(z), the adversarial loss component $-E_{z\in p_z}\{\log[1-D(G(z))]\}$ is a large number, thus penalizing the probability generated by the discriminator 208 and the reconstructed digital image generated by the generator 206.

The loss module 212 generates training updates based on evaluating a loss function, and provides the training updates to the generator 206 and the discriminator 208 to update coefficients of the generator 206 and the discriminator 208 (e.g., convolution coefficients). For instance, the loss module 212 generates the training updates by taking a derivative of the loss function with respect to the coefficients, and update the coefficients iteratively via a stochastic gradient descent of the loss function. In one example, the loss module 212 generates training updates to update coefficients of the generator 206 based on the loss function $\mathcal{L}$ described above that includes a linear combination of a pixel loss term, a gradient loss term, a context loss term, and an adversarial loss term. Additionally or alternatively, the loss module 212 generates training updates to update coefficients of the discriminator 208 based on the adversarial loss term $L_{adv}$ described above.

In one example, the training system 200 trains the generator 206 and the discriminator 208 by alternating between updating coefficients of the generator 206 and updating coefficients of the discriminator 208. For instance, coefficients of the generator 206 can be updated on a first update cycle, and used to compute reconstructed digital images on a second update cycle for which coefficients of the discriminator 208 are updated, and the process repeated so that coefficients of the generator 206 and the discriminator 208 are updated on alternate update cycles. The training system 200 can repeat the update of the generator 206 and the discriminator 208 until a loss function, such as the loss function $\mathcal{L}$ described above, is below a loss threshold (e.g., the loss threshold can be set to a percentage of a maximum value of the loss function, such as one percent).

An update cycle can include processing of any suitable number of digital images. In one example, a training set of images includes P total image pairs of input digital images and ground truth images. For instance, P can include 2500 image pairs in a training set. For efficiency, coefficients of the generator 206, the discriminator 208, or the generator 206 and the discriminator 208 can be updated on a batch basis, such as for every Q image pairs of the training set processed with P>Q. For instance, with P=2500, an appropriate value of Q can be 32 or greater.

The training system 200 can update the generator 206 and the discriminator 208 by freezing (e.g., halting the update of) coefficients of the discriminator 208 while the generator 206 is updated, and freezing the coefficients of the generator 206 while the discriminator 208 is updated. For instance, during the updating of the coefficients of the generator 206, the training system 200 can halt the update of the coefficients of the discriminator 208, and during the updating of the coefficients of the discriminator 208, the training system 200 can halt the update of the coefficients of the generator 206.

Although the training system 200 has been described to adversarially train the generator 206 and the discriminator 208 so that the generator 206 generates reconstructed digital images that reduce visibility of the dust artifacts and scratch artifacts in the training digital images and include the scenes depicted in the training digital images, additionally or alternatively the training system 200 can adversarially train the generator 206 and the discriminator 208 so that the generator 206 generates artifact digital images that denote locations of the dust and scratch artifacts in the training digital images. For instance, an artifact digital image can indicate the pixels of the training digital images that are affected by dust and scratch artifacts with a first color, e.g., white, and pixels of the training digital images that are not affected by dust and scratch artifacts with a second color, e.g., black. In this case, the training digital image 218 is an example of a digital image that can be input to the generator 206, and the training system 200 can use the synthetic digital image 216 as a ground truth image. Additionally or alternatively, the training system 200 can use the synthetic digital image 216 as an example of an artifact digital image that is not generated by the generator 206 and is input to the discriminator 208 as a "true" artifact digital image.

Example Artifact Correction System

Figure 5:
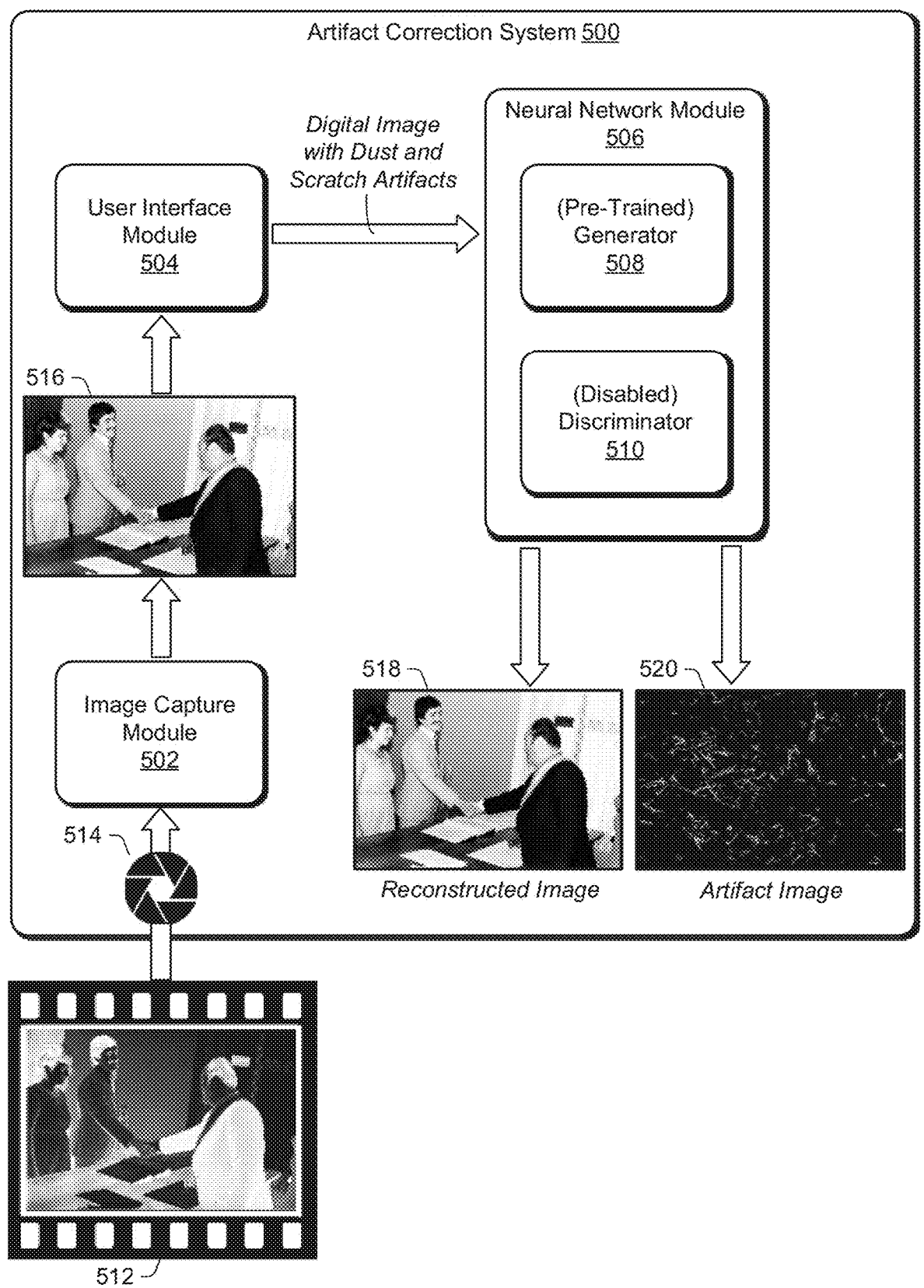
FIG. 5 illustrates an example artifact correction system usable for correcting dust and scratch artifacts in digital images in accordance with one or more aspects of the disclosure.
Figure 6:
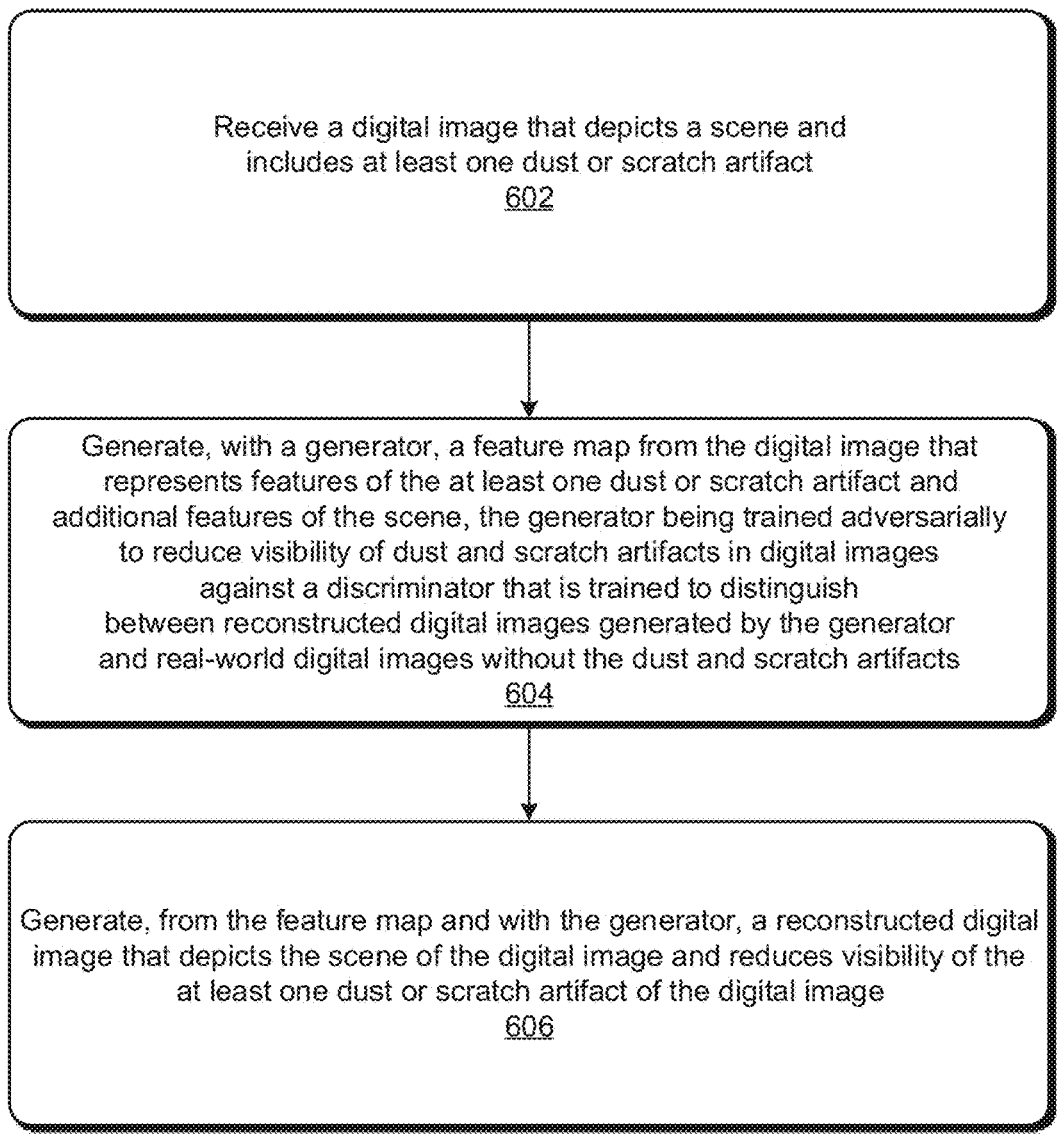
FIG. 6 illustrates a flow diagram depicting an example procedure in accordance with one or more aspects of the disclosure.

FIG. 5 illustrates an example artifact correction system 500 usable for correcting dust and scratch artifacts in digital images in accordance with one or more aspects of the disclosure, and FIGS. 6 and 7 illustrate procedures 600 and 700, respectively, in accordance with one or more aspects of the disclosure. Aspects of the procedures 600 and 700 can be implemented in hardware, firmware, software, or a combination thereof. The procedures 600 and 700 are shown as a set of blocks that specify operations performed by one or more devices and are not necessarily limited to the orders shown for performing the operations by the respective blocks. FIGS. 5-7 are next described together, with references made to the modules of FIG. 5 that may implement the operations of FIGS. 6 and 7.

In the implementation of FIG. 5, the artifact correction system 500 includes image capture module 502, user interface module 504, and neural network module 506, which includes a pre-trained generator 508 and a disabled discriminator 510. These modules and blocks can be implemented as any type of module or component in software (e.g., as software instructions that are executable with a processing system), hardware, or combinations thereof, as a standalone application, as a module or component of another device application, a plug-in module to the computing device, and in any type of computing device. The artifact correction system 500 is one example of the artifact correction system 104 constructed using these modules. For instance, signals can be redefined, and modules can be modified, combined, divided, added, or removed to form a modified system, without altering the functionality of the artifact correction system 500. Accordingly, such modified systems are considered to be within the scope of the disclosure. Furthermore, for simplicity, the artifact correction system 500 is limited to these modules and a description of some of their interconnects. The artifact correction system 500 can, however, include any suitable signals and communications between modules omitted for simplicity. Such signals can include system clocks, counters, digital image indicators, sequence indicators, reset signals, and the like.

The artifact correction system 500 can be implemented on any suitable device or devices. In one example, the training system 200 is implemented on one computing device (e.g., the computing device 102 in FIG. 1). In another example, the artifact correction system 500 is implemented on more than one computing device. For instance, parts of the artifact correction system 500 can be implemented by a first computing device, such as the computing device 102 in FIG. 1, and other parts of the artifact correction system 500 can be implemented by an additional computing device, such as the server 116.

The image capture module 502 can be implemented to capture a digital image. Hence, the image capture module 502 can include a digital camera that can be included in, or connected to, a computing device implementing the artifact correction system 500, such as a DSLR camera that is connected to a desktop computer that implements the artifact correction system 500, or a digital camera included in a cell phone that implements the artifact correction system 500.

In the example in FIG. 5, the image capture module 502 has access to a film negative 512 and captures, indicated by the shutter operation 514, a digital image 516 from the film negative 512. For instance, a user may point a digital camera of the image capture module 502 at the film negative 512 and capture the digital image 516. In one example, the image capture module 502 includes an invert function to invert the colors of the digital image 516. Hence, the film negative 512 indicates inverted colors relative to the digital image 516. In an example, the film negative 512 is black and white.

The user interface module 504 can be implemented to receive the digital image 516 from the image capture module 502 (blocks 602 and 702). Since the film negative 512 can have dust (e.g., small particles of debris) on its surface, and can include scratches (e.g., missing parts of the film negative 512), the digital image 516 depicts the scene of the film negative 512, as well as include dust and scratch artifacts, such as dark or light spots, streaks, blurry or cloudy regions, opaque regions, and the like.

The user interface module 504 generates a user interface that can display the digital image 516 and any suitable data used by or generated by the artifact correction system 500. For instance, the user interface displays the digital image 516 and metadata for the digital image 516, such as settings of the digital camera used to capture the digital image 516, including aperture, shutter speed, and ISO (which is analogous to film speed) settings. Additionally or alternatively, the user interface can display editing control and adjustment functions to edit the digital image 516, such as filters that can be applied to digital images (e.g., a sepia filter), tools that can be applied to digital images (e.g., crop and color adjustment tools), and the like. In one example, the user interface simultaneously displays the digital image 516 that includes dust and scratch artifacts and a reconstructed digital image generated from the digital image 516 that reduces the visibility of the dust and scratch artifacts, such as the reconstructed digital image 518, discussed below in more detail. By simultaneously displaying the digital image 516 and the reconstructed digital image 518, the user interface allows a user to view the corrections made by the artifact correction system in context. For example, the user may easily compare the differences between the digital image 516 and the reconstructed digital image 518.

The user interface module 504 provides the digital image 516 that includes dust and scratch artifacts to the neural network module 506, which includes a GAN including the generator 508 and the discriminator 510. The generator 508 is an example of a pre-trained generator that has been trained adversarially against the discriminator 510 by the training system 200 in FIG. 2. In one example, the neural network module 506 includes the training system 200 and uses the training system 200 to train the generator 508 and the discriminator 510.

Since the discriminator 510 is not needed when the generator 508 or the discriminator 510 are not being trained, the neural network module 506 can disable the discriminator 510 so that the discriminator 510 does not operate (e.g., process data), thus saving processor resources during operation of the artifact correction system 500. In one example, the training system 200 provides the pre-trained generator 508 to the neural network module 506, without providing the discriminator 510, to save memory resources of the artifact correction system 500. Additionally or alternatively, the neural network module 506 can remove the discriminator 510 from memory of the computing device implementing the artifact correction system 500 to disable the discriminator 510 and save memory resources.

The generator 508 receives the digital image 516 from the user interface module 504, and generates a feature map from the digital image 516 that represents features of the dust and scratch artifacts in the digital image 516 and additional features of the scene depicted by the digital image 516 (blocks 604 and 704). In one example, the generator 508 is trained adversarially to reduce visibility of dust and scratch artifacts in digital images against the discriminator 510 that is trained to distinguish between reconstructed digital images generated by the generator 508 and real-world digital images without the dust and scratch artifacts (block 604). The generator 508 then generates, from the feature map, a reconstructed digital image 518 that depicts the scene of the digital image 516 and reduces visibility of the dust and scratch artifacts of the digital image 516 (block 606). The generator 508 can generate the reconstructed digital image 518 to have a same resolution (e.g., number and layout of pixels) as the digital image 516.

In one example, the user interface module 504 receives the digital image 516 and additional digital images as a video sequence. The neural network module 506 can then repeat, for each of the additional images of the video sequence, to generate a feature map and a reconstructed digital image from the feature map. Hence, the artifact correction system can automatically and without user intervention generate reconstructed digital images that correct dust and scratch artifacts in cases where conventional artifact correction systems are simply not practical due to the manual interaction required for each digital image being adjusted.

Additionally or alternatively to generating reconstructed digital images, the generator 508 can be trained to generate artifact digital images that denote locations of dust and scratch artifacts in digital images. For instance, the generator 508 is trained adversarially against the discriminator 510 that is trained to distinguish between artifact digital images generated by the generator 508 that denote locations of the dust and scratch artifacts in digital images and other artifact digital images not generated by the generator 508 (block 704). Examples of other artifact digital images not generated by the generator 508 include artifact digital images used to form training digital images input to the generator 508 to train the generator 508. For instance, an artifact digital image can include synthetic artifacts, such as synthetic dust and synthetic scratch artifacts, as described above with regards to the synthetic digital images, and the training system 200 can combine content of a real-world digital image with the synthetic content of the artifact digital image to form a training digital image input to the generator 508. The training system can use the artifact digital image used to generate a training digital image as an example of an artifact digital image not generated by the generator.

In this case, the generator 508 then generates, from the feature map, an artifact digital image 520 that indicates pixels of the digital image 516 affected by the dust and scratch artifacts and additional pixels of the digital image 516 unaffected by the dust and scratch artifacts (block 706). For instance, the artifact digital image 520 denotes the presence of dust and scratch artifacts in the digital image 516 with white pixels and the absence of the dust and scratch artifacts in the digital image 516 with black pixels.

In one example, the artifact correction system 500 includes or has access to a reconstruction module (not shown) that can be implemented to receive the artifact digital image 520 and the digital image 516, and generate a reconstructed digital image that depicts the scene of the digital image 516 and reduces the visibility of the dust and scratch artifacts of the digital image 516 that are denoted by the artifact digital image 520. In an example, the reconstruction module is included in an image editing application, such as Adobe Photoshop®, and the artifact correction system 500 can be included as a plug-in module to the image editing application.

The systems and procedures described herein constitute improvements over conventional artifact correction systems that are not be suitable for black-and-white film negatives and that can be costly and inefficient to use, such as infrared scanners that are typically used by commercial photography labs. Rather, the systems and procedures described herein can be used to generate a digital image from a black-and-white film negative and correct dust and scratch artifacts in the digital image caused by dust and scratches on the film negative by reducing the visibility of the dust and scratch artifacts. Moreover, the systems and procedures described herein can be implemented on client devices so that users can efficiently and inexpensively correct the dust and scratch artifacts, without relying on costly commercial photography labs that can be cumbersome to access.

Moreover, the systems and procedures described herein constitute improvements over conventional artifact correction systems that introduce undesired effects when trying to correct for dust and scratch artifacts, such as causing blurriness and a lack of sharpness. In contrast, the systems and procedures described herein can reduce the visibility of dust and scratch artifacts without introducing blurriness or reducing the sharpness of a digital image. Furthermore, unlike conventional artifact correction systems that rely on manual interaction to segment and adjust individual dust and scratch artifacts in individual digital images, the systems and procedures described herein can be used in applications that require an automated workflow rather than a manual workflow due to the significant amount of digital images to be processed, such as when correcting dust and scratch artifacts in digital video frames of feature-length movies.

Example Digital Images and Performance Comparison

Figure 8:
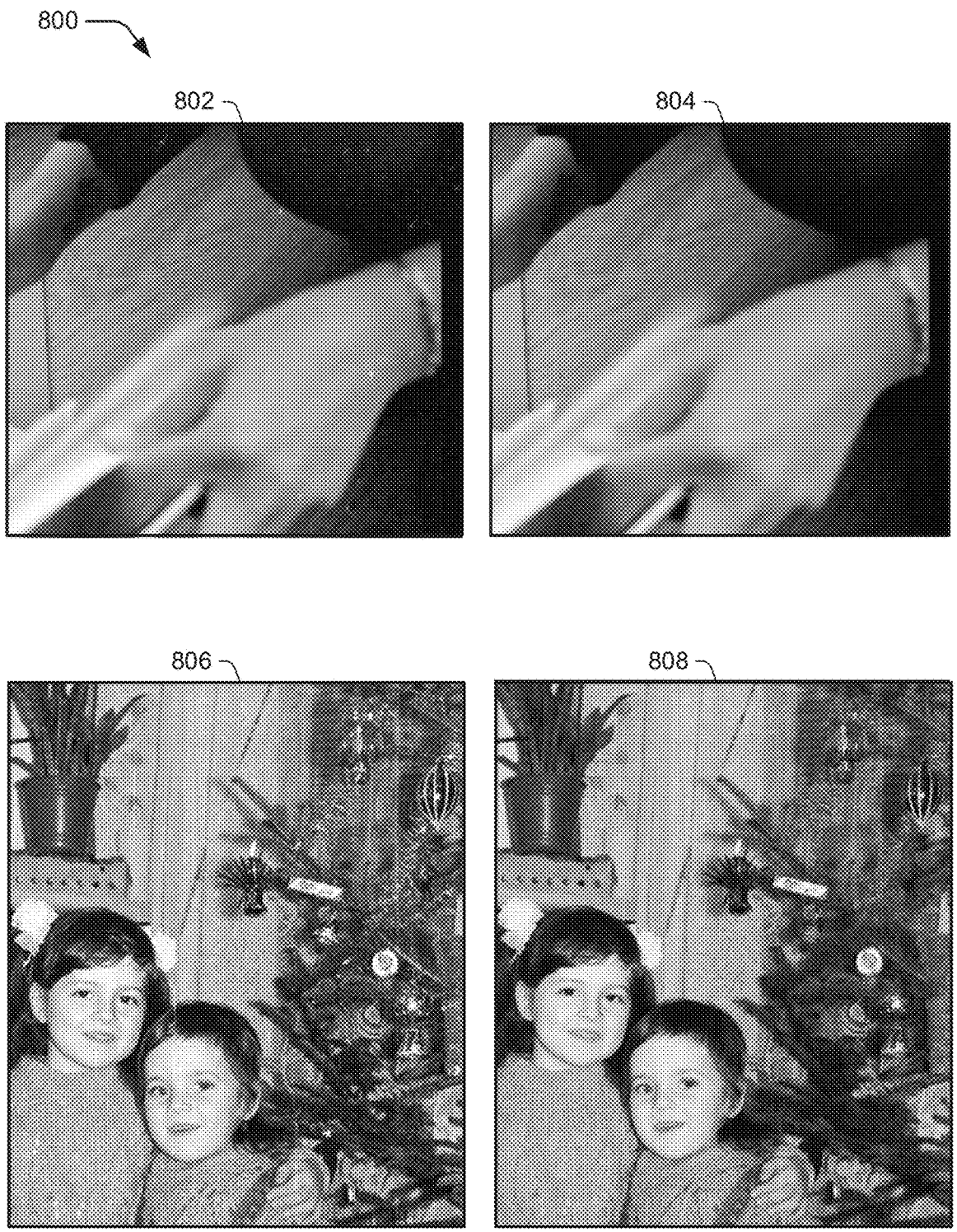
FIG. 8 illustrates example digital images in accordance with one or more aspects of the disclosure.

FIG. 8 illustrates example digital images 800 in accordance with one or more aspects of the disclosure. The digital images 800 includes two pairs of images, and each pair includes a digital image input to the artifact correction system 500 and a reconstructed digital image generated by the artifact correction system 500. For example, a first pair of images includes input digital image 802 and reconstructed digital image 804, and a second pair of images includes input digital image 806 and reconstructed digital image 808. The input digital image 802 includes numerous light spots near the person's hand that have been visually reduced by the artifact correction system 500 in the reconstructed digital image 804. In the second pair of images, the input digital image 806 includes numerous vertical streaks that have been visually reduced by the artifact correction system 500 in the reconstructed digital image 808.

The reconstructed digital images 804 and 808 are examples of digital images generated by the artifact correction system 500 that correct dust and scratch artifacts by reducing the visibility of the dust and scratch artifacts compared to the input digital images 802 and 806, respectively, while preserving the image details. Generally, the artifact correction system 500 significantly outperforms conventional artifact correction systems when correcting dust and scratch artifacts. For example, Table 1 compares two performance measures for the artifact correction system 500 and three conventional artifact correction systems. The first conventional artifact correction system is denoted by Pix2Pix in Table 1 and is described in "Image-to-image translation with conditional adversarial networks", 2017 *IEEE Conference on Computer Vision and Pattern Recognition (CVPR)*, Honolulu, Hi., 2017, pp. 5967-5976, to P. Isola et al. The second conventional artifact correction system is denoted by Segnet in Table 1 and is described in "Deep learning approach for artefacts correction on photographic films", *Fourteenth International Conference on Quality Control by Artificial Vision*, Vol. 11172, p. 111720M, International Society for Optics and Photonics, 2019, to D. Strubel et al. The third approach is used in Adobe's Photoshop® and is denoted in Table 1 by Photoshop®.

One performance measure of Table 1 below is a peak signal-to-noise ratio denoted by PSNR and calculated according to $$PSNR = 10\log_{10}\frac{(2^d - 1)\cdot W \cdot H}{\sum_{i=1}^{W}\sum_{j=1}^{H}(T[i,j] - \hat{T}[i,j])^2}$$

where d is the number of bits representing the pixel content, W is the image width in number of pixels, H is the image height in number of pixels, and $T[i,j]$, $\hat{T}[i,j]$ denote the i-th row, j-th column pixel value in the ground truth and reconstructed digital image, respectively. The other performance measure of Table 1 below is a structure similarity index denoted by SSIM and calculated according to $$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)}$$

where x and y denote two image patches of common size N×N, $\mu_x$ and $\mu_y$ denote the averages of pixel values of the patches x and y, respectively, $\sigma_x^2$ and $\sigma_y^2$ denote the variances of pixel values of the patches x and y, respectively, $\sigma_{xy}$ denotes the correlation coefficient of pixel values of the patches x and y, and $c_1$ and $c_2$ denote variables for stability. Notably, larger values of both the PSNR and SSIM performance measures indicate better performance.

TABLE 1

| Example Performance Results | | |
| --- | --- | --- |
| Artifact Correction System | PSNR | SSIM |
| Artifact Correction System 500 | 35.12 | 0.92 |
| Pix2Pix | 31.91 | 0.8 |
| Segnet | 25.07 | 0.65 |
| Photoshop ® | 22.17 | 0.62 |

As indicated in Table 1, the artifact correction system 500 as described herein significantly outperforms the conventional artifact correction systems.

Example Systems and Devices

Figure 9:
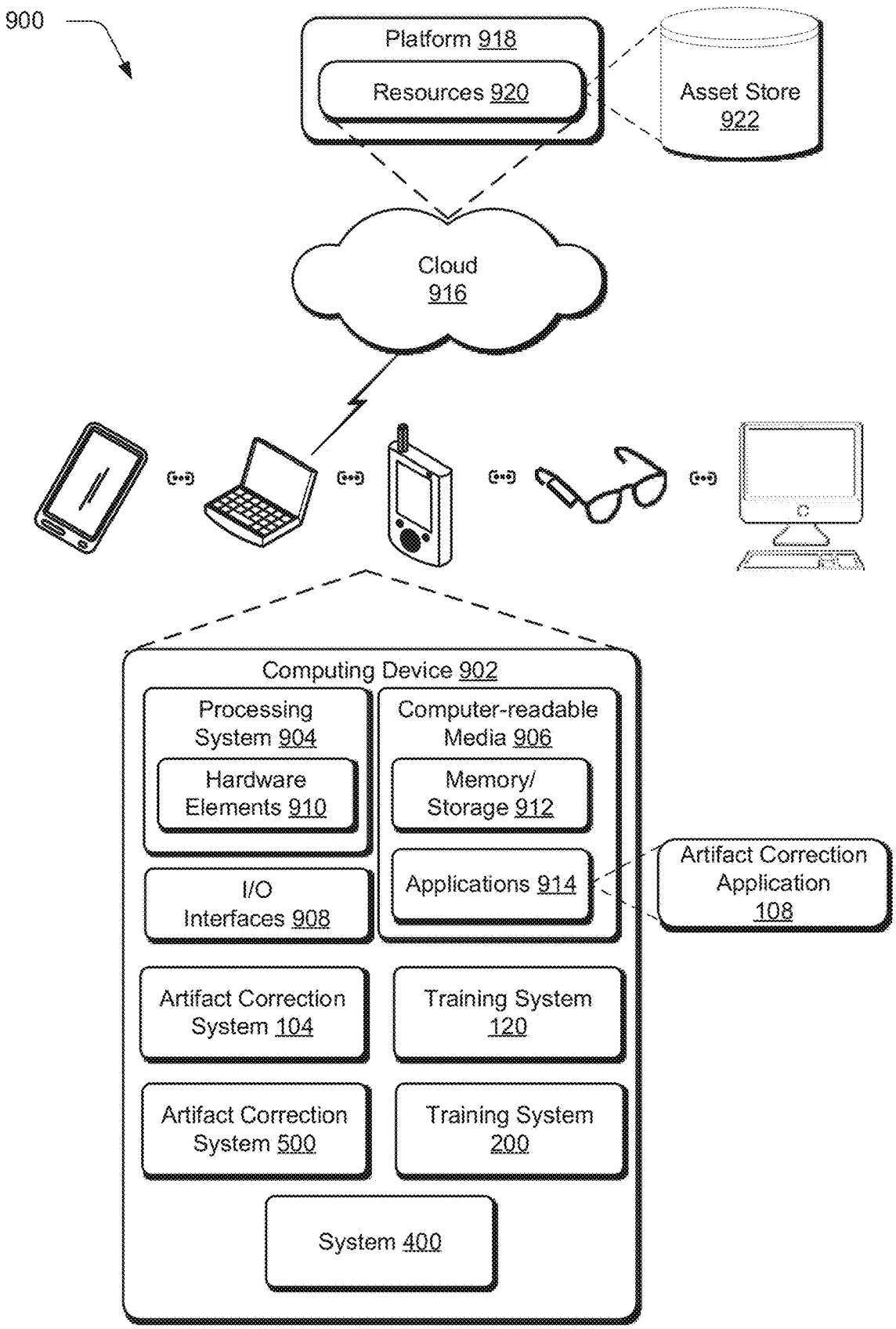
FIG. 9 illustrates an example system including various components of an example device that can be implemented as any type of computing device as described and/or utilized with reference to FIGS. 1-8 to implement aspects of the techniques described herein.

FIG. 9 illustrates an example system 900 including an example computing device 902 that is representative of one or more computing systems and devices that can be utilized to implement the various techniques described herein. This is illustrated through inclusion of the artifact correction system 104, the artifact correction system 500, the training system 120, the training system 200, the system 400, and the artifact correction application 108, which operate as described above. The computing device 902 can be, for example, a user computing device (e.g., the computing device 102), or a server device of a service provider, (e.g., the server 116). Furthermore, the computing device 902 can include an on-chip system, multiple computing devices, combinations thereof, or any other suitable computing device or computing system. Accordingly, FIG. 9 illustrates the computing device 902 as one or more of a tablet, a laptop computer, a smart phone, smart eye glasses, and a desktop computer, though these examples are illustrative and in no way are meant to limit the type or number of devices that can be represented by the computing device 902.

The example computing device 902 includes a processing system 904, one or more computer-readable media 906, and one or more I/O interfaces 908 that are communicatively coupled to each other. Although not shown, the computing device 902 can further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that can be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors can be comprised of semiconductor(s) and transistors (e.g., electronic integrated circuits (ICs)). In such a context, processor-executable instructions may be electronically-executable instructions. The processors 110 in FIG. 1 are an example of the processing system 904.

The computer-readable storage media 906 is illustrated as including memory/storage 912. The computer-readable storage media 106 in FIG. 1 is an example of memory/storage of the memory/storage 912. The memory/storage 912 can include volatile media (such as random access memory (RAM)), nonvolatile media (such as read only memory (ROM), flash memory, optical disks, magnetic disks, and so forth), or combinations thereof. The memory/storage 912 can include fixed media (e.g., RAM, ROM, a fixed hard drive, and so on) as well as removable media (e.g., flash memory, a removable hard drive, an optical disc, and so forth). The computer-readable media 906 can be configured in a variety of other ways as further described below.

The input/output interfaces 908 are representative of functionality to allow a user to enter commands and information to the computing device 902, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Accordingly, the input/output interfaces 908 can include a touchscreen, such as a capacitive touchscreen, a resistive touchscreen, a surface acoustic wave touchscreen, an infrared touchscreen, an optical imaging touchscreen, an acoustic pulse recognition touchscreen, combinations thereof, and the like. Thus, the computing device 902 can be configured in a variety of ways as further described below to support user interaction.

The computing device 902 also includes applications 914, which are representative of any suitable applications capable of running on the computing device 902, and can include a web browser which is operable to access various kinds of web-based resources (e.g., images, videos, digital video frames, assets, media clips, content, configuration files, services, user profiles, and the like). The applications 914 include the artifact correction application 108, which operates as previously described. Furthermore, the applications 914 can include any applications supporting the artifact correction system 104, the artifact correction system 500, the training system 120, the training system 200, and the system 400.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 910 and the computer-readable media 906 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more of the hardware elements 910, or combinations thereof. The computing device 902 can be configured to implement particular instructions and functions corresponding to the software and hardware modules. Accordingly, implementation of a module that is executable by the computing device 902 as software may be achieved at least partially in hardware, e.g., through use of computer-readable storage media and the hardware elements 910 of the processing system 904. The instructions and functions may be executable/operable by one or more articles of manufacture (for example, one or more computing devices such as computing device 902 or processing systems such as the processing system 904) to implement techniques, modules, and examples described herein.

The techniques described herein can be supported by various configurations of the computing device 902 and are not limited to the specific examples of the techniques described herein. This functionality may also be implemented all or in part through use of a distributed system, such as over a "cloud" 916 via a platform 918. The cloud 916 includes and is representative of the platform 918 for resources 920. The platform 918 abstracts underlying functionality of hardware (e.g., servers) and software resources of the cloud 916. The resources 920 can include applications, data, or applications and data that can be utilized while computer processing is executed on servers that are remote from the computing device 902. The resources 920 can also include services provided over the Internet, through a subscriber network, such as a cellular or Wi-Fi network, or combinations thereof. The resources 920 can include asset store 922, which stores assets, such as digital images, digital videos, training digital images, ground truth digital images, neural networks, design files, documents, user profile data, user image libraries, animation sequences, metadata of assets, and the like, and can be accessed by the computing device 902.

Generally, the resources 920 may be licensed, purchased, or may be made freely available, (e.g., without authentication, license, or account-based access). The resources 920 can include any suitable combination of services and content, such as an image editing service, an on-line shopping service, an image editing service, an artwork drawing service, a web development and management service, a collaboration service, a social networking service, a messaging service, an advertisement service, a graphics design service, an animation service, an image storage service (including storage of photos, digital images, video clips, documents, records, files, and the like), a graphics editing service, an asset distribution service, and so forth. Content may include various combinations of assets as described above, including document designs and review documents.

The platform 918 can abstract resources and functions to connect the computing device 902 with other computing devices. The platform 918 can also serve to abstract scaling of resources to provide a corresponding level of scale to encountered demand for the resources 920 that are implemented via the platform 918. Accordingly, in an interconnected device embodiment, implementation of functionality described herein may be distributed throughout the system 900. For example, the functionality can be implemented in part on the computing device 902 as well as via the platform 918 that abstracts the functionality of the cloud 916.

CONCLUSION

In one or more implementations, a digital medium environment includes at least one computing device. Systems, devices, and techniques are described herein for correcting dust and scratch artifacts in digital images. A training system is implemented to generate training digital images by combining content of clean digital images that depict scenes and are free of artifacts caused by dust and scratches with content of synthetic digital images that depict synthetic artifacts, such as synthetic dust artifacts and synthetic scratch artifacts. The training system can generate the synthetic digital images as black-and-white digital images having white pixels that denote the presence of synthetic dust and scratch artifacts and black pixels that denote the absence of the synthetic dust and scratch artifacts. The training system can also obtain training digital images that include pairs of real-world digital images, each pair including a "before" image with dust and scratch artifacts and an "after" image that has been manually corrected to visually reduce the dust and scratch artifacts. The training system can use the training digital images to train a generative-adversarial neural network that includes a generator and a discriminator. For instance, the training system can adversarially train the generator to correct (e.g., visually reduce the appearance of) the dust and scratch artifacts of the training digital images against the discriminator to distinguish between reconstructed digital images generated by the generator and real-world digital images. Once trained, the training system can provide the generator to an artifact correction system that can be installed on a client device to correct dust and scratch artifacts in user-provided digital images by reducing the visibility of the dust and scratch artifacts. The artifact correction system is suitable for digital images captured from black-and-white or color film negatives, and can be used in applications that require automated workflows due to the sheer number of digital images to be corrected for dust and scratch artifacts.

Although implementations of correcting dust and scratch artifacts in digital images have been described in language specific to features and/or methods, the appended claims are not necessarily limited to the specific features or methods described. Rather, the specific features and methods are disclosed as example implementations of correcting dust and scratch artifacts in digital images, and other equivalent features and methods are intended to be within the scope of the appended claims. Further, various different examples are described and it is to be appreciated that each described example can be implemented independently or in connection with one or more other described examples.

What is claimed is:

1. An artifact correction system implemented by a computing device in a digital medium environment, the artifact correction system comprising:
   a user interface module implemented at least partially in hardware of the computing device to receive a digital image that depicts a scene and includes at least one dust or scratch artifact; and
   a neural network module having a generator and implemented at least partially in the hardware of the computing device to:
      generate, with the generator, a feature map from the digital image that represents features of the at least one dust or scratch artifact and additional features of the scene, the generator being trained adversarially to reduce visibility of dust and scratch artifacts in digital images against a discriminator that is trained to generate probabilities that digital images input to the discriminator are real-world digital images without the dust and scratch artifacts not generated by the generator or are reconstructed digital images generated by the generator; and
      generate, from the feature map and with the generator, a reconstructed digital image that depicts the scene of the digital image and reduces visibility of the at least one dust or scratch artifact of the digital image by filling pixels of the digital image corresponding to the at least one dust or scratch artifact with pixel content of patches of the digital image automatically and without user intervention.

2. The artifact correction system as described in claim 1, wherein the neural network module is implemented to train the generator with training digital images input to the generator that include a combination of content of clean digital images that depict scenes and are free of the dust and scratch artifacts and content of synthetic digital images that depict at least one of synthetic dust artifacts or synthetic scratch artifacts.

3. The artifact correction system as described in claim 2, wherein the synthetic digital images include black-and-white digital images having one of the black or the white denote the at least one of the synthetic dust artifacts or the synthetic scratch artifacts, and an other of the black or the white denote an absence of the at least one of the synthetic dust artifacts or the synthetic scratch artifacts.

4. The artifact correction system as described in claim 2, wherein the neural network module is implemented to adjust at least one of a size or a rotation of the training digital images.

5. The artifact correction system as described in claim 1, further comprising an image capture module implemented to capture the digital image from a film negative.

6. The artifact correction system as described in claim 1, wherein the user interface module is implemented to receive the digital image and additional digital images as a video sequence, and the neural network module is implemented to repeat, for each additional image of the additional digital images, the generate the feature map and the generate the reconstructed digital image.

7. The artifact correction system as described in claim 1, wherein the user interface module is implemented to simultaneously display the digital image and the reconstructed digital image.

8. The artifact correction system as described in claim 1, wherein the neural network module is implemented to generate the reconstructed digital image to have a same resolution as the digital image.

9. In a digital medium environment for training a neural network to correct dust and scratch artifacts in digital images, a method implemented by a computing device, the method comprising:
   generating training digital images by combining pixel content of clean digital images with pixel content of synthetic digital images, the clean digital images depicting scenes and being free of artifacts caused by dust and scratches and the synthetic digital images depicting at least one of synthetic dust artifacts or synthetic scratch artifacts; and
   training a generator of the neural network based on the training digital images including:
      generating, with the generator, reconstructed digital images that reduce visibility of the at least one of the synthetic dust artifacts or the synthetic scratch artifacts in the training digital images;
      generating, with a discriminator of the neural network, probabilities that images input to the discriminator are real digital images not generated by the generator instead of reconstructed digital images generated by the generator; and updating at least one coefficient of the generator based on the reconstructed digital images, the probabilities, and a loss function of the clean digital images, the loss function including an adversarial loss term which measures a function of the probabilities generated by the discriminator.

10. The method as described in claim 9, further comprising:

receiving real-world digital images that depict real-world scenes; and training the discriminator of the neural network including:
generating, with the discriminator, additional probabilities that the real-world digital images are real digital images; and
updating one or more coefficients of the discriminator based on an adversarial loss function of the probabilities and the additional probabilities.

11. The method as described in claim 10, further comprising:

halting the updating of the one or more coefficients of the discriminator during the updating of the at least one coefficient of the generator; and halting the updating of the at least one coefficient of the generator during the updating of the one or more coefficients of the discriminator.

12. The method as described in claim 11, further comprising repeating the updating of the at least one coefficient of the generator and the updating of the one or more coefficients of the discriminator until the loss function is below a loss threshold.

13. The method as described in claim 9, further comprising receiving additional training digital images that include pairs of "before" images and "after" images, the "before" images including real-world digital images having the dust and scratch artifacts and the "after" images having the dust and scratch artifacts manually corrected, and wherein the training the generator includes:

generating, with the generator, additional reconstructed digital images from the "before" images; and the updating the at least one coefficient of the generator includes evaluating the loss function by comparing the additional reconstructed digital images to the "after" images.

14. The method as described in claim 9, wherein the loss function additionally includes a pixel loss term, a gradient loss term, and a context loss term.

15. The method as described in claim 9, further comprising generating the training digital images including:

augmenting the synthetic digital images by at least one of resizing the synthetic digital images, rotating the synthetic digital images, or changing an intensity of the synthetic digital images to form augmented synthetic digital images; and combining content of the augmented synthetic digital images with the content of the clean digital images to generate the training digital images.

16. The method as described in claim 9, further comprising generating the training digital images including:

augmenting the clean digital images by at least one of resizing the clean digital images, rotating the clean digital images, or extracting patches of the clean digital images to form augmented clean digital images; and combining content of the augmented clean digital images with the content of the synthetic digital images to generate the training digital images.

17. The method as described in claim 9, wherein generating the training digital images includes over-writing the pixel content of the clean digital images with pixel content of the synthetic digital images.

18. In a digital medium environment for correcting dust and scratch artifacts in digital images, a method implemented by a computing device, the method comprising:

receiving a digital image that depicts a scene and includes at least one dust or scratch artifact;

generating, with a generator of a neural network, a feature map from the digital image that represents features of the at least one dust or scratch artifact and additional features of the scene, the generator being trained adversarially to fool a discriminator of the neural network that is trained to generate probabilities that digital images input to the discriminator are artifact digital images generated by the generator that denote locations of the dust and scratch artifacts in the digital images or are other artifact digital images not generated by the generator; and generating, with the generator and from the feature map, an artifact digital image that indicates pixels of the digital image affected by the at least one dust or scratch artifact and additional pixels of the digital image unaffected by the at least one dust or scratch artifact.

19. The method as described in claim 18, further comprising generating, based on the artifact digital image, a reconstructed digital image that depicts the scene of the digital image and reduces visibility of the at least one dust or scratch artifact of the digital image.

20. The method as described in claim 18, wherein the other artifact digital images are used to form training digital images input to the generator to train the generator.

* * * * *